US010676194B2

(12) United States Patent
Papke et al.

(10) Patent No.: US 10,676,194 B2
(45) Date of Patent: Jun. 9, 2020

(54) CONTOURED CLASS DIVIDER

(71) Applicant: B/E AEROSPACE, INC., Winston-Salem, NC (US)

(72) Inventors: Robert Papke, Camano Island, WA (US); Shawn Claflin, Seattle, WA (US); Jefferey McKee, Duvall, WA (US); Trevor Skelly, Mercer Island, WA (US); Mario Diliani, Snohomish, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 573 days.

(21) Appl. No.: 15/291,863

(22) Filed: Oct. 12, 2016

(65) Prior Publication Data

US 2017/0283061 A1  Oct. 5, 2017

Related U.S. Application Data

(63) Continuation-in-part of application No. 15/153,104, filed on May 12, 2016, now Pat. No. 10,370,106.
(Continued)

(51) Int. Cl.
*B64D 11/00* (2006.01)
*B64D 11/06* (2006.01)

(52) U.S. Cl.
CPC ...... *B64D 11/0023* (2013.01); *B64D 11/0606* (2014.12); *B64D 11/0636* (2014.12)

(58) Field of Classification Search
CPC ............ B64D 11/0023; B64D 11/0606; B64D 11/003; B64D 11/0619; B64D 11/0627; B64R 21/06
See application file for complete search history.

(56) References Cited

U.S. PATENT DOCUMENTS 2,268,927 A * 1/1942 Demme .................. A47F 7/163
 211/45
3,423,121 A * 1/1969 Lipkin .................... B60R 21/06
 160/229.1
(Continued)

FOREIGN PATENT DOCUMENTS

DE 10322611 B3 8/2004
DE 10 2005 009 750 A1 9/2006
(Continued)

OTHER PUBLICATIONS

International Search Report and Written Opinion on International Application PCT/US2018/053617 dated Dec. 10, 2018. 19 pages.
(Continued)

*Primary Examiner* — Medhat Badawi
(74) *Attorney, Agent, or Firm* — Donna P. Suchy

(57) ABSTRACT

In a preferred embodiment, a contoured class divider for dividing an aircraft cabin includes a panel positioned between an aft seat and a forward seat, the panel having an aft-facing convex contour closely matching an aft-facing contour of a seatback of the forward seat and configured to enhance space utilization. The contoured class divider may include an articulation system to articulate at least a portion of the panel from a first position (normal operation) to a second position (emergency landing). The contoured class divider may provide up to an additional 12 inches of space which can be used to reduce seat pitch (and thereby enhance passenger comfort) or increase the number of rows of seats on a given aircraft.

18 Claims, 26 Drawing Sheets

Related U.S. Application Data

(60) Provisional application No. 62/317,706, filed on Apr. 4, 2016.

(56) References Cited

U.S. PATENT DOCUMENTS

| | | | | |
|---|---|---|---|---|
| 3,703,310 | A * | 11/1972 | Lystad | B60N 2/3011 |
| | | | | 296/10 |
| 4,597,549 | A | 7/1986 | Ryan | |
| 4,861,103 | A * | 8/1989 | Vallee | B64D 25/04 |
| | | | | 297/216.2 |
| 4,899,962 | A * | 2/1990 | Mueller | B64D 25/00 |
| | | | | 160/354 |
| 5,133,587 | A * | 7/1992 | Hadden, Jr. | B60N 2/4214 |
| | | | | 297/146 |
| 5,165,626 | A * | 11/1992 | Ringger | B64D 11/0023 |
| | | | | 16/282 |
| 5,306,066 | A | 4/1994 | Saathoff | |
| 5,320,308 | A * | 6/1994 | Bilezikjian | B60N 2/2227 |
| | | | | 244/122 R |
| 5,338,090 | A * | 8/1994 | Simpson | B60N 2/4221 |
| | | | | 297/216.2 |
| 5,340,059 | A * | 8/1994 | Kanigowski | B64D 25/00 |
| | | | | 244/118.5 |
| 5,344,210 | A * | 9/1994 | Marwan | B64D 25/04 |
| | | | | 297/216.2 |
| 5,350,144 | A * | 9/1994 | Lary | A45D 20/12 |
| | | | | 248/183.1 |
| 5,393,013 | A * | 2/1995 | Schneider | B64D 11/0023 |
| | | | | 160/351 |
| 5,445,861 | A | 8/1995 | Newton et al. | |
| 5,482,230 | A * | 1/1996 | Bird | B64C 1/10 |
| | | | | 244/118.5 |
| 5,531,499 | A | 7/1996 | Vecchio et al. | |
| 5,573,304 | A * | 11/1996 | Glockl | A47C 3/023 |
| | | | | 248/626 |
| 5,577,358 | A * | 11/1996 | Franke | B64D 11/0023 |
| | | | | 244/118.5 |
| 5,649,721 | A * | 7/1997 | Stafford | B60R 21/04 |
| | | | | 244/118.5 |
| 5,716,026 | A * | 2/1998 | Pascasio | B64D 11/00 |
| | | | | 105/315 |
| 5,788,185 | A * | 8/1998 | Hooper | B64D 11/0619 |
| | | | | 244/118.6 |
| 5,816,534 | A * | 10/1998 | Schumacher | B64D 11/0023 |
| | | | | 244/119 |
| 5,836,547 | A | 11/1998 | Koch | |
| 5,839,757 | A | 11/1998 | Von Lange | |
| 5,876,064 | A | 3/1999 | Ament | |
| 6,158,771 | A | 12/2000 | Nusser et al. | |
| 6,234,526 | B1 | 5/2001 | Song et al. | |
| 6,245,408 | B1 | 6/2001 | Bitzer | |
| 6,264,238 | B1 | 7/2001 | MacDonald | |
| 6,340,171 | B1 | 1/2002 | Hirth et al. | |
| 6,523,779 | B1 * | 2/2003 | Michel | B64D 11/0023 |
| | | | | 244/118.5 |
| 6,588,705 | B1 | 7/2003 | Frank | |
| 6,672,662 | B1 * | 1/2004 | Balk | B60N 2/3013 |
| | | | | 297/238 |
| 6,692,069 | B2 * | 2/2004 | Beroth | A47C 1/0352 |
| | | | | 244/118.6 |
| 6,698,819 | B1 | 3/2004 | Mozer et al. | |
| 6,758,507 | B2 | 7/2004 | Tarahomi et al. | |
| 6,780,488 | B2 | 8/2004 | Holemans | |
| 6,808,206 | B2 | 10/2004 | Yata et al. | |
| 7,083,146 | B2 * | 8/2006 | Hiesener | B64D 11/00 |
| | | | | 244/118.5 |
| 7,213,882 | B2 * | 5/2007 | Dryburgh | A47C 1/0352 |
| | | | | 297/354.13 |
| 7,287,796 | B2 | 10/2007 | Coles et al. | |
| 7,905,451 | B2 * | 3/2011 | Schotte | B64D 11/0023 |
| | | | | 244/118.6 |
| 7,975,963 | B2 | 7/2011 | Merz et al. | |
| 8,091,939 | B2 | 1/2012 | Forsyth | |
| 8,590,838 | B2 * | 11/2013 | Cook | B64D 11/02 |
| | | | | 244/118.6 |
| 8,960,602 | B2 * | 2/2015 | Neumann | B64D 11/0023 |
| | | | | 244/118.5 |
| 9,199,740 | B2 * | 12/2015 | Ehlers | B64D 11/0691 |
| 9,327,836 | B2 * | 5/2016 | Weitzel | B64D 11/06 |
| 9,352,839 | B2 * | 5/2016 | Gehret | B60R 21/207 |
| 9,428,132 | B2 | 8/2016 | Obadia et al. | |
| 9,511,867 | B2 * | 12/2016 | Schliwa | B64D 11/0691 |
| 9,650,146 | B2 * | 5/2017 | Boenning | B64D 11/06 |
| 9,718,552 | B2 * | 8/2017 | Zheng | B64D 11/0648 |
| 9,868,528 | B2 * | 1/2018 | Mayer | B64D 11/0023 |
| 10,011,058 | B2 | 7/2018 | Sutton | |
| 10,059,423 | B2 | 8/2018 | Smithson et al. | |
| 10,106,187 | B1 * | 10/2018 | Farrar | B62B 7/123 |
| 10,358,173 | B2 | 7/2019 | Gussen et al. | |
| 2003/0094837 | A1 * | 5/2003 | Williamson | B60N 3/004 |
| | | | | 297/163 |
| 2006/0006704 | A1 * | 1/2006 | Skelly | B60N 2/62 |
| | | | | 297/188.08 |
| 2007/0138780 | A1 | 6/2007 | Beki | |
| 2007/0222266 | A1 * | 9/2007 | Lucci | A47C 1/121 |
| | | | | 297/331 |
| 2009/0200422 | A1 * | 8/2009 | Johnson | B64D 11/0023 |
| | | | | 244/118.5 |
| 2009/0242149 | A1 | 10/2009 | Breuer et al. | |
| 2010/0078985 | A1 * | 4/2010 | Mahoney | B32B 3/10 |
| | | | | 297/446.1 |
| 2010/0255919 | A1 * | 10/2010 | Kelly | A47D 13/105 |
| | | | | 472/118 |
| 2011/0062283 | A1 * | 3/2011 | Breuer | B64D 11/00 |
| | | | | 244/118.5 |
| 2012/0292967 | A1 * | 11/2012 | Cailleteau | A47C 7/446 |
| | | | | 297/311 |
| 2013/0248651 | A1 * | 9/2013 | Burrows | B64D 11/0023 |
| | | | | 244/118.5 |
| 2014/0014774 | A1 * | 1/2014 | Pozzi | B64D 11/06 |
| | | | | 244/118.6 |
| 2014/0124623 | A1 * | 5/2014 | Chandler | B64D 11/0023 |
| | | | | 244/118.5 |
| 2014/0124624 | A1 * | 5/2014 | Jacobsen | B64D 11/0023 |
| | | | | 244/118.5 |
| 2014/0138986 | A1 * | 5/2014 | Tsuneyama | B62D 25/163 |
| | | | | 296/187.09 |
| 2014/0158826 | A1 * | 6/2014 | Young | B64D 11/02 |
| | | | | 244/118.5 |
| 2014/0175219 | A1 * | 6/2014 | Young | B64D 11/0023 |
| | | | | 244/118.5 |
| 2014/0375090 | A1 * | 12/2014 | Wegenka | B60N 2/242 |
| | | | | 297/188.09 |
| 2015/0035340 | A1 * | 2/2015 | Lussan | B64D 11/06 |
| | | | | 297/463.1 |
| 2015/0284084 | A1 * | 10/2015 | Mayer | B64D 11/0023 |
| | | | | 244/118.5 |
| 2015/0284085 | A1 * | 10/2015 | McKee | B64D 11/02 |
| | | | | 244/118.5 |
| 2015/0287564 | A1 | 10/2015 | Benke et al. | |
| 2016/0198864 | A1 * | 7/2016 | Yang | A47D 9/00 |
| | | | | 5/655 |
| 2016/0296419 | A1 * | 10/2016 | Paulussen | A61H 31/006 |
| 2016/0297525 | A1 * | 10/2016 | Walton | B64D 11/0023 |
| 2016/0304204 | A1 * | 10/2016 | McKee | B64D 11/003 |
| 2017/0021929 | A1 * | 1/2017 | McKee | B64D 11/0691 |
| 2017/0021933 | A1 * | 1/2017 | Pozzi | B64D 11/0636 |
| 2017/0129608 | A1 * | 5/2017 | Reams | B64D 11/0624 |
| 2017/0267350 | A1 * | 9/2017 | Heidtmann | B64D 11/00 |
| 2017/0267353 | A1 * | 9/2017 | McIntosh | B64D 11/0606 |
| 2017/0283060 | A1 | 10/2017 | Papke et al. | |
| 2017/0283061 | A1 | 10/2017 | Papke et al. | |
| 2017/0283065 | A1 | 10/2017 | Papke et al. | |
| 2018/0022457 | A1 | 1/2018 | Papke et al. | |
| 2018/0222589 | A1 | 8/2018 | Papke et al. | |

(56) References Cited

U.S. PATENT DOCUMENTS

FOREIGN PATENT DOCUMENTS

| EP | 0 361 717 A1 | 4/1990 |
| EP | 1 698 552 A1 | 9/2006 |
| EP | 2 113 427 A2 | 11/2009 |
| EP | 2 727 836 A2 | 5/2014 |
| EP | 3 219 555 A1 | 9/2017 |
| EP | 3 219 601 A1 | 9/2017 |
| FR | 2877281 A1 | 5/2006 |
| WO | WO-93/01088 A1 | 1/1993 |
| WO | WO-2018/071596 A1 | 4/2018 |

OTHER PUBLICATIONS

International Search Report and Written Opinion on International Patent Application No. PCT/US2016/032061 dated Dec. 7, 2016. 11 pages.
International Search Report and Written Opinion on International Patent Application No. PCT/US2017/056222 dated Feb. 26, 2018. 12 pages.
U.S. Office Action on U.S. Appl. No. 15/153,104 dated Sep. 20, 2018. 18 pages.
International Search Report and Written Opinion on International Patent Application No. PCT/US2018/025891 dated Jun. 1, 2018. 10 pages.

* cited by examiner

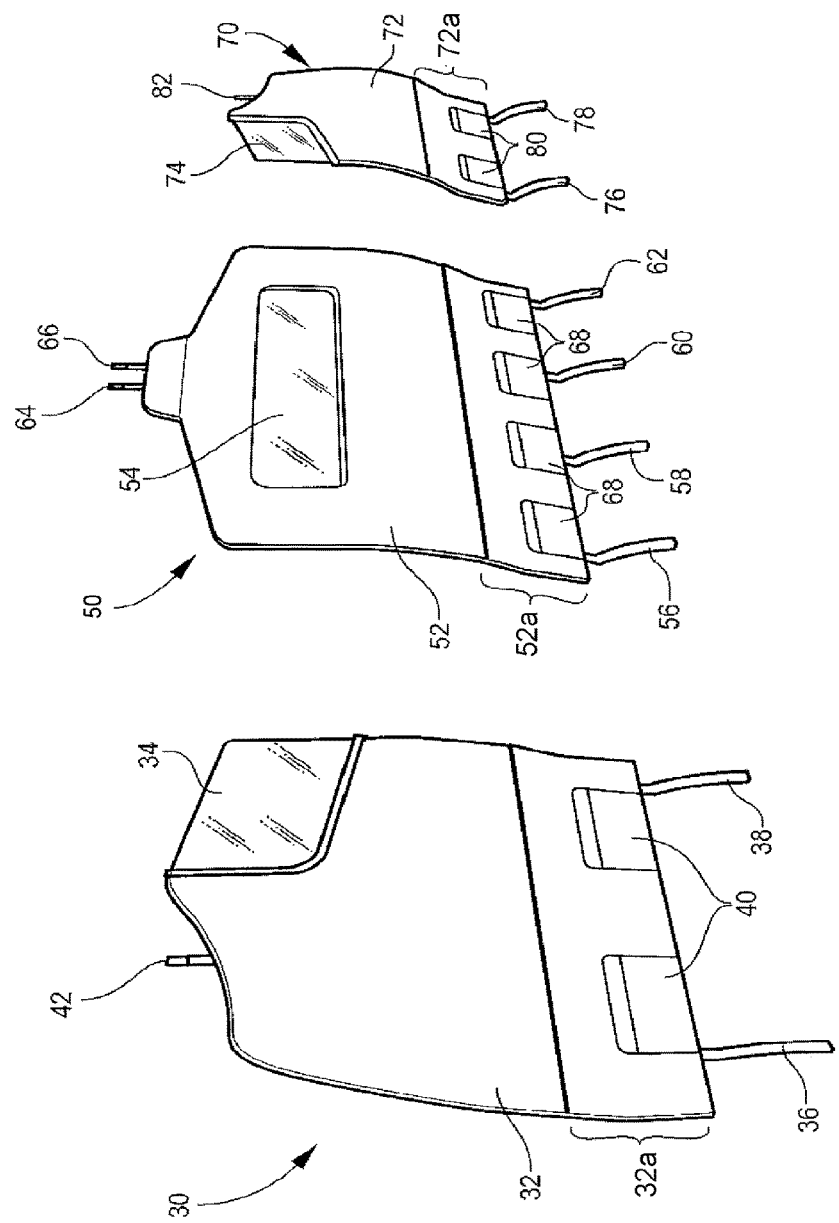

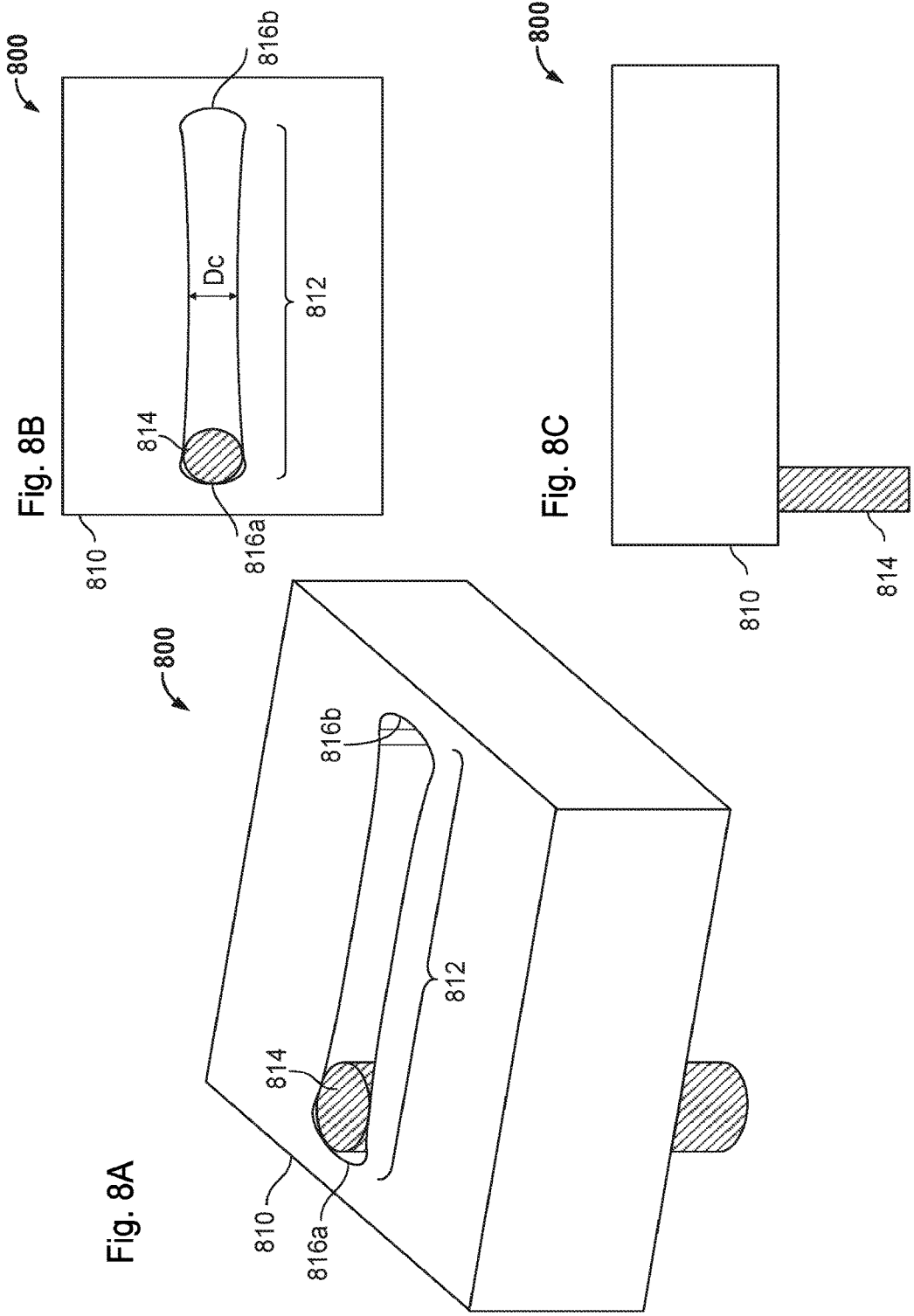

CONTOURED CLASS DIVIDER

CROSS REFERENCES TO RELATED APPLICATIONS

This application is a continuation-in-part of and claims priority to U.S. patent application Ser. No. 15/153,104 entitled "Contoured Class Divider" and filed May 12, 2016, which claims priority to U.S. Provisional Patent Application No. 62/317,706 filed Apr. 4, 2016, the contents of each of which are incorporated by reference in their entireties. The present disclosure is also related to PCT application number PCT/US16/32061 entitled "Contoured Class Divider" and filed May 12, 2016, the contents of which is incorporated by reference in its entirety.

BACKGROUND

The present disclosure relates to commercial aircraft multi-class cabin arrangements and how they can be efficiently separated from each other. One method to achieve division of the seat groups is by providing a hard divider between rows of seats attached to the aircraft seat tracks and an upper support element such as an overhead storage bin assembly or passenger service unit (PSU) rail.

Head Injury Criteria (HIC) requirements are provided, for example, by the Federal Aviation Administration (FAA) to establish standards in passenger protection in passenger aircraft cabin design. Certain HIC requirements are set forth in 14 CFR 23.562, which is incorporated herein by reference. The HIC requirements, for example, result in clearance requirements within a head impact zone to reduce likelihood of passenger concussion in the event of an emergency such as rapid deceleration. Further, the requirements specify a measurable HIC number resulting from, for example, a head impact against objects that are within the head impact zone of a passenger, such as a fore passenger seat or a partition. In this manner, should a passenger's head impact an object such as the forward backrest of the fore passenger seat, the force of the impact is absorbed at least in part through the backrest design.

Federal regulations also dictate certain standards for static load handling and dynamic load handling. 14 CFR 25.562 (incorporated herein by reference) provides that seats and restraint systems must be able to withstand a 16G dynamic load. 14 CFR 25.561 (incorporated herein by reference) provides that other aircraft structures such as bulkheads must be able to withstand a 9G forward static load. It is understood in the industry that if structures are spaced within one inch of one another, it must be demonstrated that the structures are capable of sharing loads during normal use and emergency landing conditions. Due to the complexity of the analysis, those skilled in the art of aircraft interior components generally avoid placing components within one inch of one another. For this reason, a minimum spacing of one inch has generally been maintained between bulkheads and seating systems (e.g. between a bulkhead and the aft surface of an aircraft seat).

SUMMARY OF ILLUSTRATIVE EMBODIMENTS

In one aspect, to optimize the usable space between cabin classes, a contoured class divider according to this application is specifically designed to nest into the volume behind the seat body following the profile of the seatback while still allowing for adequate seatback recline. In some embodiments, the form of the divider allows the seat immediately behind the contoured class divider to be located several inches closer to the seat forward of it, thus increasing the opportunity for increased seat pitch and passenger legroom in the cabin.

In one aspect, to increase passenger safety in the event of a rapid deceleration (e.g., as would occur during an emergency landing) a locking mechanism is design to release to allow the partition to move forwardly, increasing the clearance between the passenger and the divider. The locking mechanism, in one example, may include a shear pin which remains in its locked position until it is subjected to longitudinal acceleration associated with an emergency landing. Under those conditions the deceleration force experienced by the divider is sufficient to overcome the pin static shear force and the divider moves forwardly.

In another aspect, to increase passenger safety in the event of rapid deceleration, a contoured class divider according to this application includes at least one energy absorbing zone to absorb the energy of a head impact in the event of an emergency situation. In one example, an energy absorbing zone includes one or more structurally weakened portions designed to deform or break as a result of a threshold dynamic load. In other examples, the energy absorbing zone includes one or more portions embedded with energy absorbing material. The energy absorbing material may be foam. In further examples, the energy absorbing zone is designed to deform in a predetermined manner.

In a further aspect, the placement of a class divider panel within less than one inch of a seat or restraint system is facilitated by providing a known impact or interaction points between the divider and seat back. Impact protrusions or other design elements described herein may provide known points at which the divider will impact the seat, which will in turn simplify and make practical the calculations necessary to show that the divider and seat are able to withstand the projected load sharing in an emergency landing.

These and other objects and advantages of the embodiments described herein may be achieved, in some implementations, by providing a contoured class divider that includes a curved panel. The curved panel may be mounted into seat tracks T behind a selected row of seats. The curve of the panel may closely correspond to the shape of the back of the selected row of seats and may nest into the volume behind the seatback while still allowing for adequate seatback recline. More specifically, a contoured class divider may be provided for dividing an aircraft cabin according to a predetermined class arrangement and including a divider panel having a contour closely matching a contour of a forward-positioned seatback and adapted for being positioned in closely, spaced-apart relation to the seatback for providing additional space aft of the seat. At least one leg may be provided for supporting the panel about an aircraft cabin deck. A viewing window may be formed in the panel for providing the ability of a flight attendant to observe areas of the cabin forward or aft of the divider.

In one non-limiting illustrative example, a contoured class divider for dividing an aircraft cabin may include a panel positioned between a aft seat and a forward seat, the panel having an aft-facing convex contour closely matching an aft-facing contour of a seatback of the forward seat and configured to provide a gain of space forward of the aft seat; and at least one foot inserted into a seat track of the aircraft cabin; an articulation system to articulate the panel from a rearward position to a forward position and to increase the space between the divider and the seats immediately aft thereof (or, alternatively, permit those seats to be moved forward and, in some configurations, thereby enable an additional row of seats to be disposed on the airplane); and at least one connector that connects a top end of the panel and an overhead structural element of the aircraft cabin.

In one non-limiting illustrative example, a contoured class divider for dividing an aircraft cabin includes a panel positioned between an aft seat and a forward seat, the panel having an aft-facing convex contour closely matching an aft-facing contour of a seatback of the forward seat seatback and configured to provide increased space between the divider and the seats immediately aft thereof (or, alternatively, permit those seats to be moved forward and, in some configurations, thereby enable an additional row of seats to be disposed on the airplane), and a head impact zone configured to limit an impact shock between a passenger head and the panel; and at least one foot inserted into a seat track of the aircraft cabin; an articulation system to articulate the panel from a rearward position to a forward position and to increase the gain of space forward of the aft seat; and at least one connector that connects a top end of the panel and an overhead structural element of the aircraft cabin.

In one non-limiting illustrative example, an apparatus to divide class sections within a commercial aircraft is presented. The apparatus may include a divider panel positioned between an aft seat and a forward seat, the panel having an aft-facing convex contour closely matching an aft-facing contour of a seatback of the forward seat seatback and configured to provide increased space between the divider and the seats immediately aft thereof (or, alternatively, permit those seats to be moved forward and, in some configurations, thereby enable an additional row of seats to be disposed on the airplane). The apparatus may include at least one impact protrusion configured to be the initial point of impact if the forward seat makes contact with the panel. The panel may include at least one foot inserted into a seat track of the aircraft cabin. The apparatus may include an articulation system to articulate the panel from a rearward position to a forward position and vice-versa, allowing the gain of space forward of the aft seat; and at least one connector that connects a top end of the panel and an overhead structural element of the aircraft cabin.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIG. 5 is a forward perspective view of an example set of two side class dividers and a center class divider;

FIGS. 8A-8C illustrate views of an example locking system for locking a position of the contoured class divider upon articulation;

DETAILED DESCRIPTION OF ILLUSTRATIVE EMBODIMENTS

Figure 1:
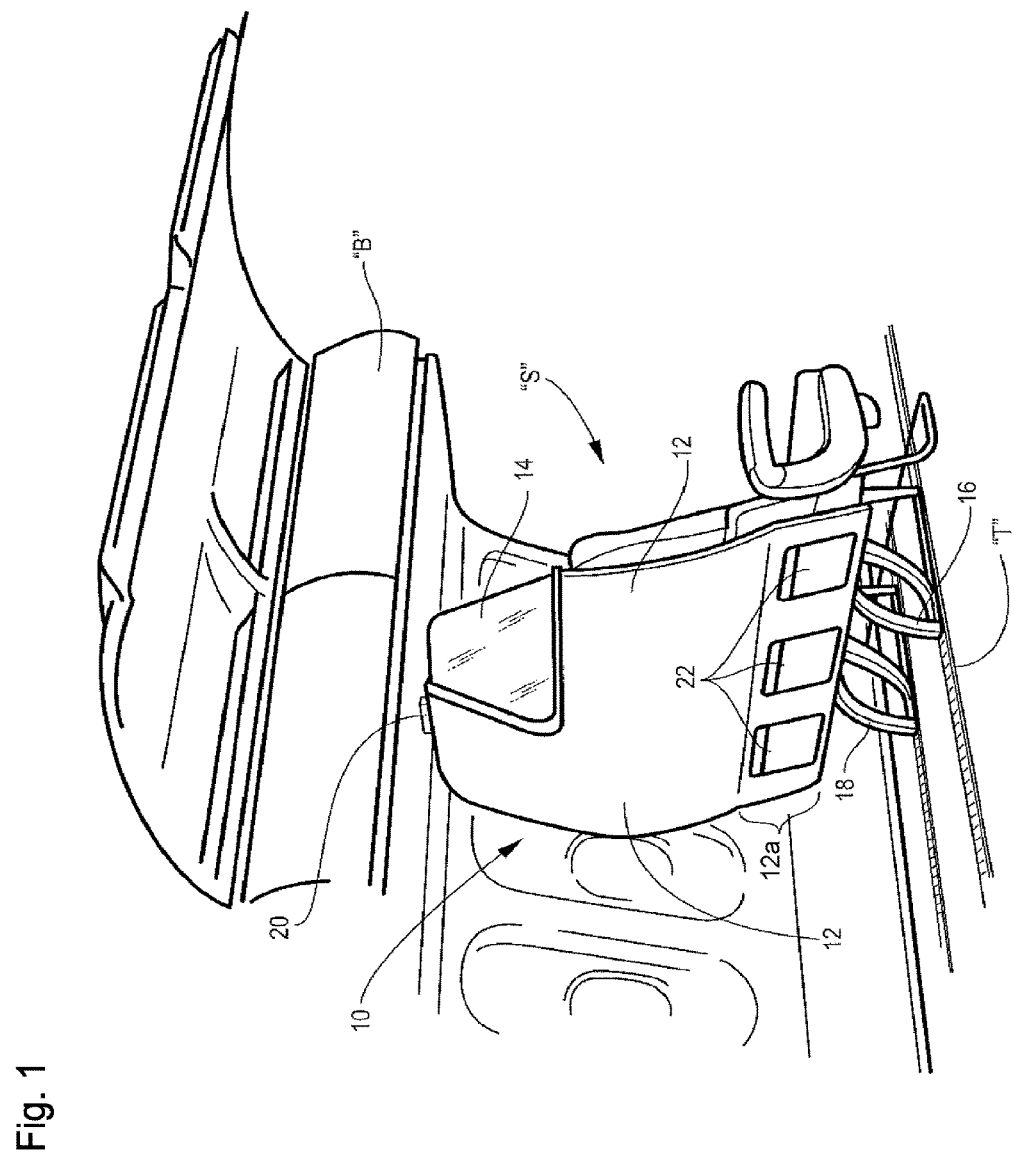
FIG. 1 is a forward perspective view of an aircraft cabin, showing an example contoured class divider and forward-positioned seats.

Referring now specifically to FIG. 1 of the drawings, a contoured port side class divider 10 is positioned directly behind a row of two first or business class passenger seats S such as are conventionally found in commercial aircraft cabins. Such cabins typically include both structural and decorative panels and overhead stowage bins for passenger luggage and other items. The divider 10 may include a fixed, rigid monument in the form of a panel 12 attached to floor-mounted seat tracks T and the overhead stowage bin B of the aircraft cabin. The exact attachment configuration may be dependent upon aircraft type and cabin configuration. The contoured port side class divider 10 may include an attendant viewing window 14. The attendant viewing window 14, for example, may be inset into an outer corner of the upper part of the panel 12 that can be defined by the airlines' cosmetic specifications. The window 14 may be clear or automatically dimmable. The divider 10 may separate a premium cabin area (e.g. first class or business class) from another cabin area (e.g. coach class seating).

Figure 2:
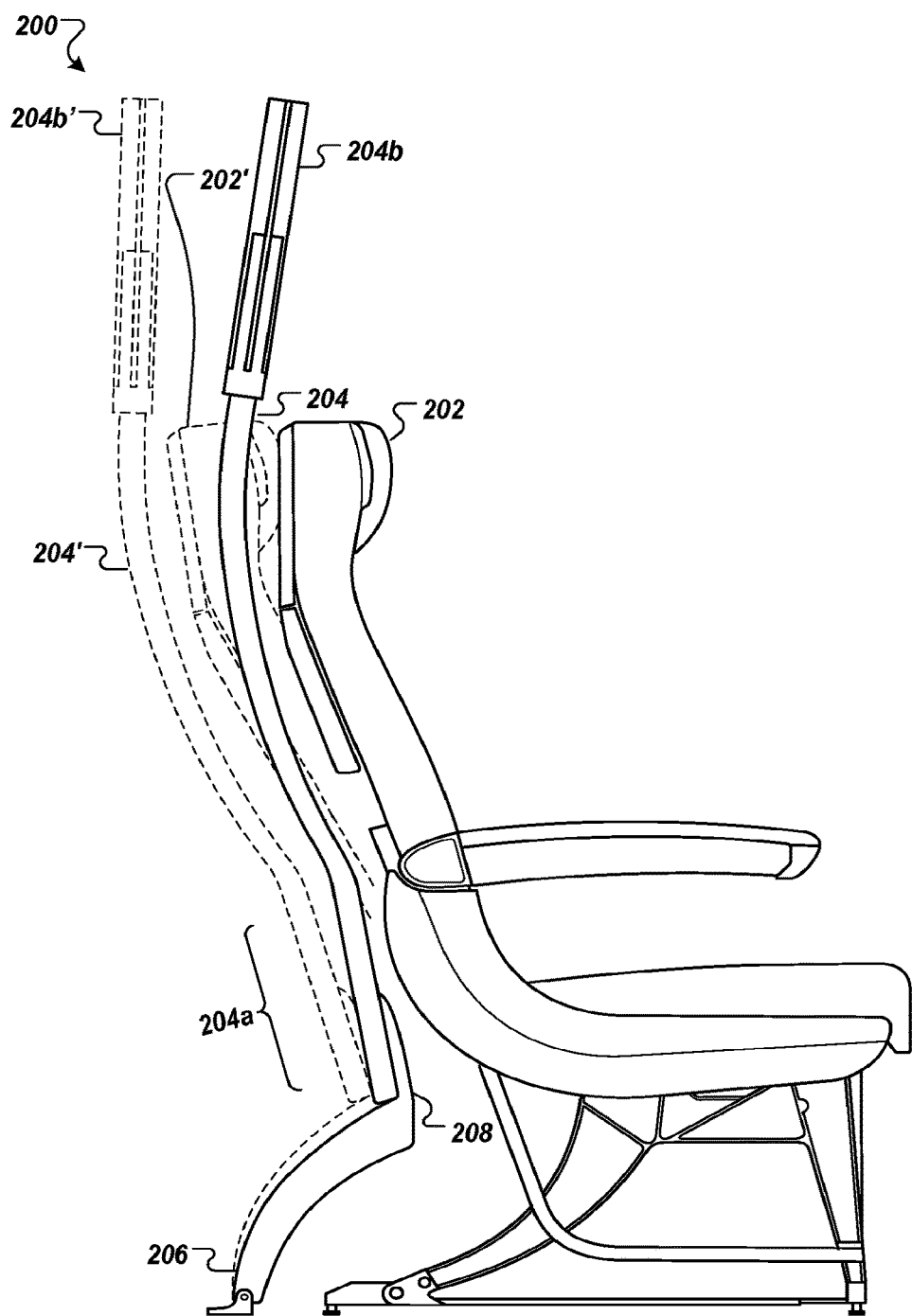
FIG. 2 is a side view of an example contoured class divider and forward-positioned seat.

Referring to FIG. 2, in some embodiments, a contoured class divider 200 optimizes use of the space behind the seat 202 that is normally not utilized or inefficiently utilized. By forming a panel 204 that follows the contour of the back of seat 202, the passenger in the seats aft of the divider may be provided enhanced space while also enhancing the ability of the seat and divider system to meet Head Impact Criteria (HIC) requirements. As shown, the panel 204 in the rear-facing direction is generally concave with a lower section 204a that is relatively flat in order to accommodate optionally supplied pockets 22 (illustrated in FIG. 1) for use by occupants of aft-positioned seats.

Returning to FIG. 1, three pockets 22 correspond to three main cabin seats (not shown) positioned immediately aft of the pockets. The contoured divider enables the aft seats (not shown) to be moved forward one to six inches towards the divider 10, more preferably three to five inches toward the divider 10 and in a currently preferred embodiment about four inches toward the divider 10. A panel 12, in some embodiments, is elevated off the floor by support legs 16, 18, allowing for stowage of passenger items under the seats S forward of the divider 10 by the passengers in the three main cabin seats.

The legs 16, 18, in some embodiments, are bowed rearwardly in a convex manner. This may provide additional clearance between the legs 16, 18 of the divider 10 and the rear legs of the seat. Such a configuration allows the bottom of the divider 10 to offset further forward and nest closer into the back of the seat S in front, thus, increasing the living space for the passengers immediately aft of the divider. It may also provide enhanced resistance to deflection of the divider 10 in the aft direction, as might occur if the divider is impacted by excessive recline of the seatback of the seat S or 202 or if forced rearwardly by a passenger. In alternative configurations, the legs 16, 18 are bowed forwardly in a concave manner (not shown). This configuration has the advantages that the legs 16, 18 generally follow the contour of the rear legs of the seats 202, provide more ingress and egress foot clearance for passengers in the three main cabin seats, and enhanced resistance to forward deflection of the divider.

Figure 3:
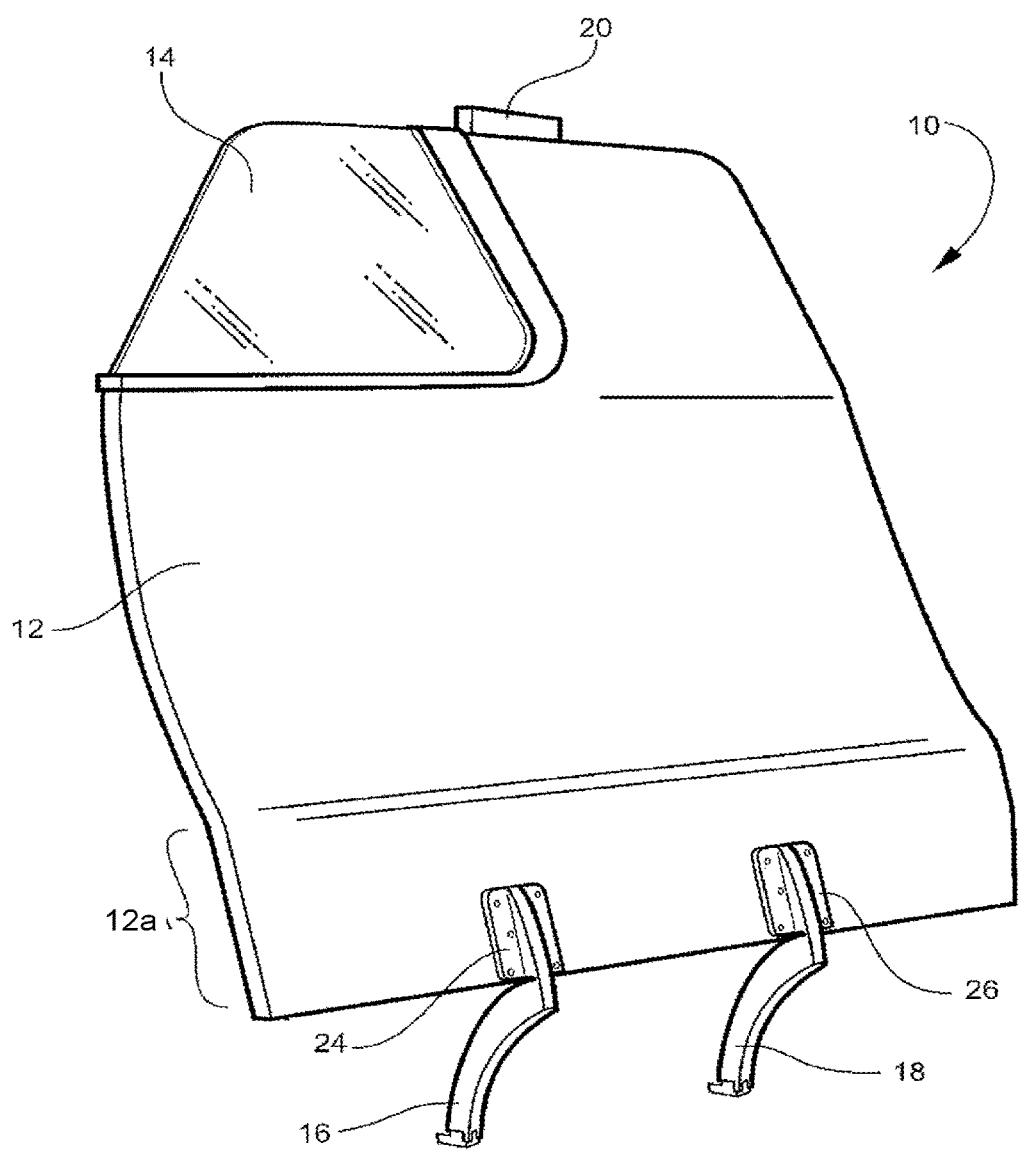
FIG. 3 is an aft perspective view of an example contoured class divider.

Referring to FIG. 3, a top end of the divider 10 may be secured against deflection by a connector 20 that attaches the divider 10 to an overhead structure below the bins B. Therefore, both the top and bottom of the divider 10 may be secured against movement. In the circumstance of a stationary mount of the divider 10, sufficient space may be provided between the panel 12 and the seats S to allow for the conventional amount of seatback recline. The panel 12 may also provide additional legroom for the occupants of seats aft of the divider 10 through both the contoured curve and the opening provided by the legs 16, 18.

In some embodiments, the legs 16, 18 are coupled to the divider by force distributing flanges 24 and 26. These flanges disperse the load transferred between the legs and panel 12 such that the panel can be of a relatively lightweight construction with either modest or no structural reinforcement in the region of the leg 16 and 18.

Returning to FIG. 2, in some embodiments an upper portion 204b of the panel 204 is generally straight and arranged in a substantially vertical orientation when in the normal operative position (illustrated in dotted lines). The upper portion 204b may include a connector (not illustrated), such as connector 20 of FIG. 1, to secure the contoured divider panel 200 to an overhead structure, such as overhead storage bins. The contoured class divider 200, in some embodiments, is designed to automatically move to a forward position (shown in solid lines) in an emergency situation involving substantial deceleration or other emergency circumstance. For example, to provide additional head clearance for aft-positioned passengers in the event of an emergency landing, the contoured class divider 200 may be configured to automatically actuate from its rearward position (dashed lines) to the forward position (solid lines). Various configurations designed to enable automatic deflection of the contoured class divider position are described in detail below.

In another example, the contoured class divider 200 may be positioned in the forward (solid line) position during take-off and landing, and in the rearward (dashed line) position in-flight. For example, as illustrated in dashed lines, the passenger seat 202' may only have clearance to move to a rearward position (illustrated in dashed lines) when the contoured class divider is positioned in the rear (dashed line) position. In this situation, the positioning of the contoured class divider 200 may be actuated by a passenger or crew member. In one example, a passenger may cause the contoured class divider 200 to actuate to a rearward position by selecting a control such as the conventional passenger seat back recline control. In another example, a crew member may have access to a control positioned proximate the overhead bin (e.g. on the underside of the bin adjacent the slot into which a connector extends, or inside the bin).

Referring now to FIG. 5, a set of contoured dividers, in some implementations, include a port divider 30, a center divider 50, and a starboard divider 70. Port divider 30, as illustrated, includes a panel 32. The port divider 30, in some examples, may be attached to floor-mounted seat tracks via legs 36, 38 and to the overhead stowage bin of the aircraft cabin via connector 42 in a manner similar to that described in relation to FIGS. 1 and 2. The connector 42 preferably mates with the overhead bin in a manner that permits the panel to actuate between the forward and rearward positions. The exact attachment configuration, in some embodiments, is dependent upon aircraft type and cabin configuration. The divider 30 may include an attendant viewing window 34 that is inset into an outer corner of the upper part of the panel 32 that permits crew to view through the divider 30 when standing. This provides privacy for the seated passengers while improving visibility of crew members. The window 34, in some examples, may be clear or have electronically adjustable opacity, tint, or reflectivity.

The panel 32, in the illustrative embodiment, is generally concave in the rear-facing direction with a lower section 32a that is relatively flat. The lower section 32a, for example, may be designed to accommodate pockets 40 for use by occupants of aft-positioned seats. The profile of the top end of the panel 32, in the illustrative embodiment, is curved to fit a fuselage and storage bin configuration different than that shown in FIGS. 1-4. The port divider 30 may be secured against deflection by a connector 42 that attaches the port divider 30 to an overhead structure (not shown) such as the underside of a storage bin.

The center divider 50, in some embodiments, includes a panel 52. The center divider 50, in some examples, may be attached to floor-mounted seat tracks via legs 56, 58, 60, and 62 and to the overhead stowage bin of the aircraft cabin by connectors 64, 66 in the manner discussed above. The center divider 50 may include, for example, an attendant viewing window 54 that is inset into an outer corner of the upper part of the panel 52 that may have the properties discussed above. Legs 56, 58, 62, and 62 may be bowed rearwardly as shown and as described above. The panel 52 in the rear-facing direction, in the illustrative embodiment, is generally concave with a lower section 52a that is relatively flat. The lower section 52a, for example, may be designed to accommodate pockets 68 for use by occupants main cabin seats positioned immediately aft of the divider 50. The profile of the top end of the panel 52, in the illustrative embodiment, is curved to fit storage bins mounted on the center aisle above the center passengers. The center divider 50 may be secured against deflection by connectors 64, 66 that attach the center divider 50 to an overhead structure, not shown. The connectors preferably permit the divider to move between a rear position and forward position, as discussed above.

A starboard side divider 70, in some implementations, may be attached to floor-mounted seat tracks via legs 76, 78 and to the overhead stowage bin of the aircraft cabin via connector 82 in a manner similar to that described above. The starboard divider 70 may include an attendant viewing window 74 that is inset into a corner of the upper part of the panel 72 that may have the properties and functionality discussed above. The panel 72 in the rear-facing direction, in the illustrative embodiment, is generally concave with a lower section 72a that is relatively flat. The lower section 72a, for example, may be designed to accommodate pockets 80 for use by occupants of passengers in the seats immediately aft of the divider 70. The profile of the top end of the panel 72, in the illustrative embodiment, is curved to fit a storage bin configuration different than that shown in FIGS.

1-4. The connector 82 preferably permits the divider to move between a rear position and forward position, as discussed above.

Figure 6:
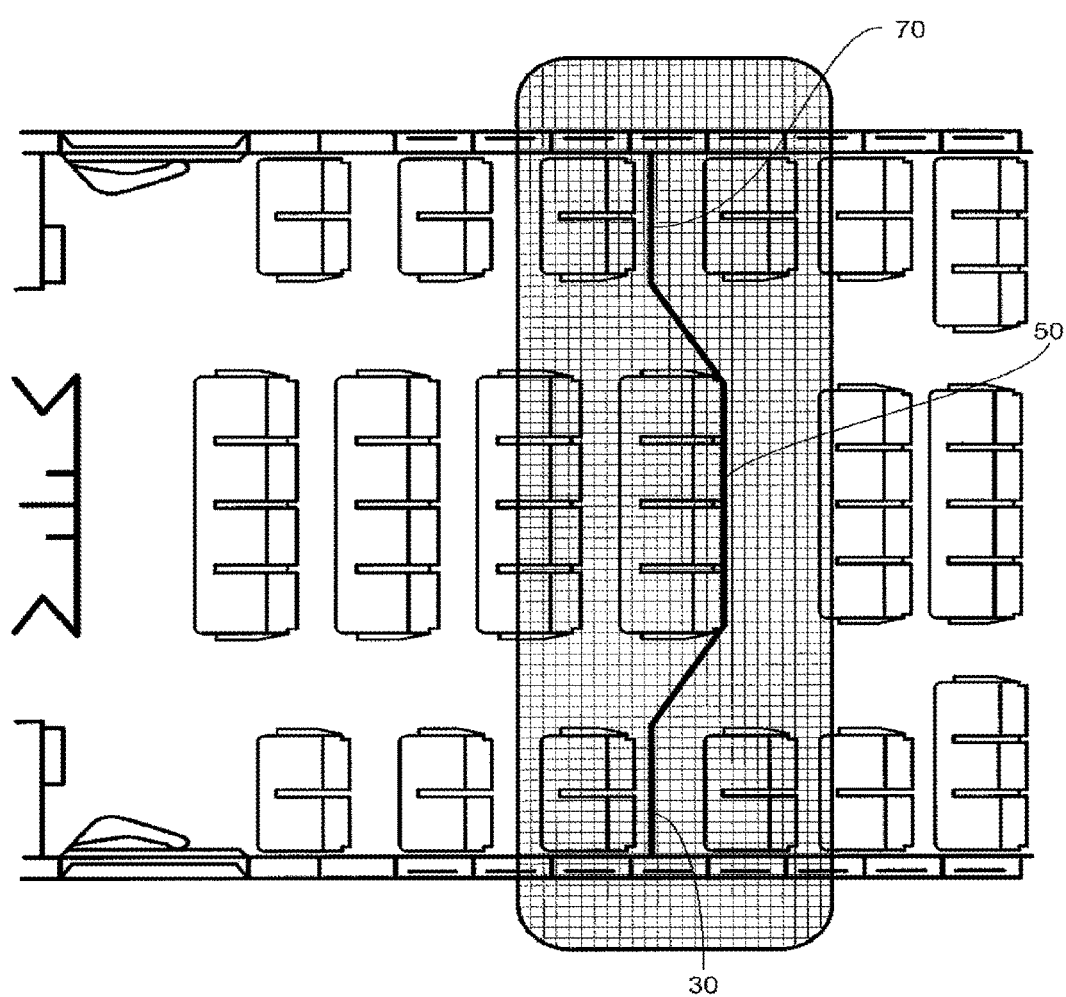
FIG. 6 is a partial plan view of an aircraft cabin showing an example placement of side contoured class dividers and a center class divider.

As shown in FIG. 6, the port side, center and starboard side class dividers 30, 50 and 70, in an illustrative embodiment, are positioned to divide an aircraft cabin into separate classes. The dividers advantageously form a divider system wherein the starboard, center and port dividers are positioned a varying longitudinal positions (fore/aft) in the cabin. This helps accommodate galley and other structures which are often disposed in the center of the cabin and can require the center column of seats to be shifted rearwardly relative to the starboard or port columns of seats.

Figure 4A:
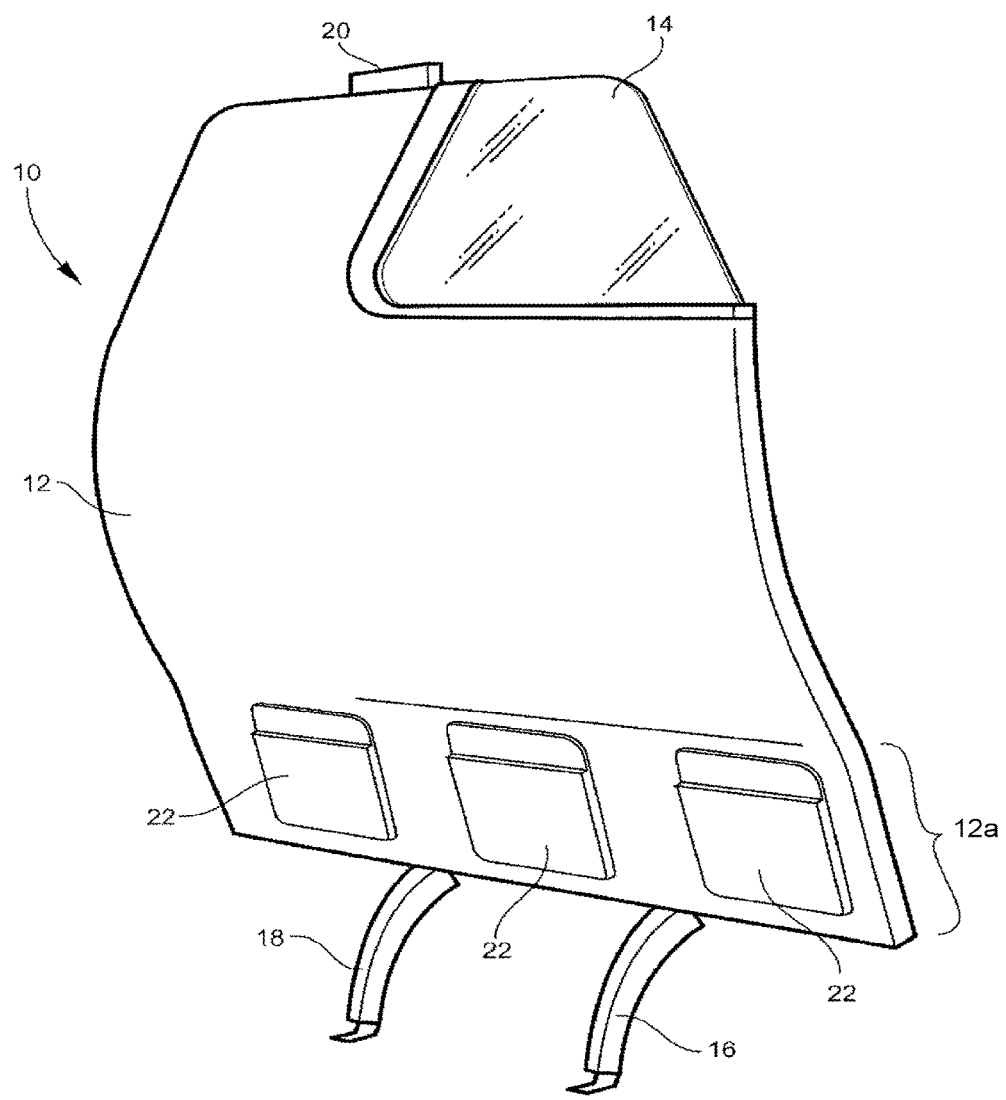
FIG. 4A is a forward perspective view of an example contoured class divider.
Figure 7A:
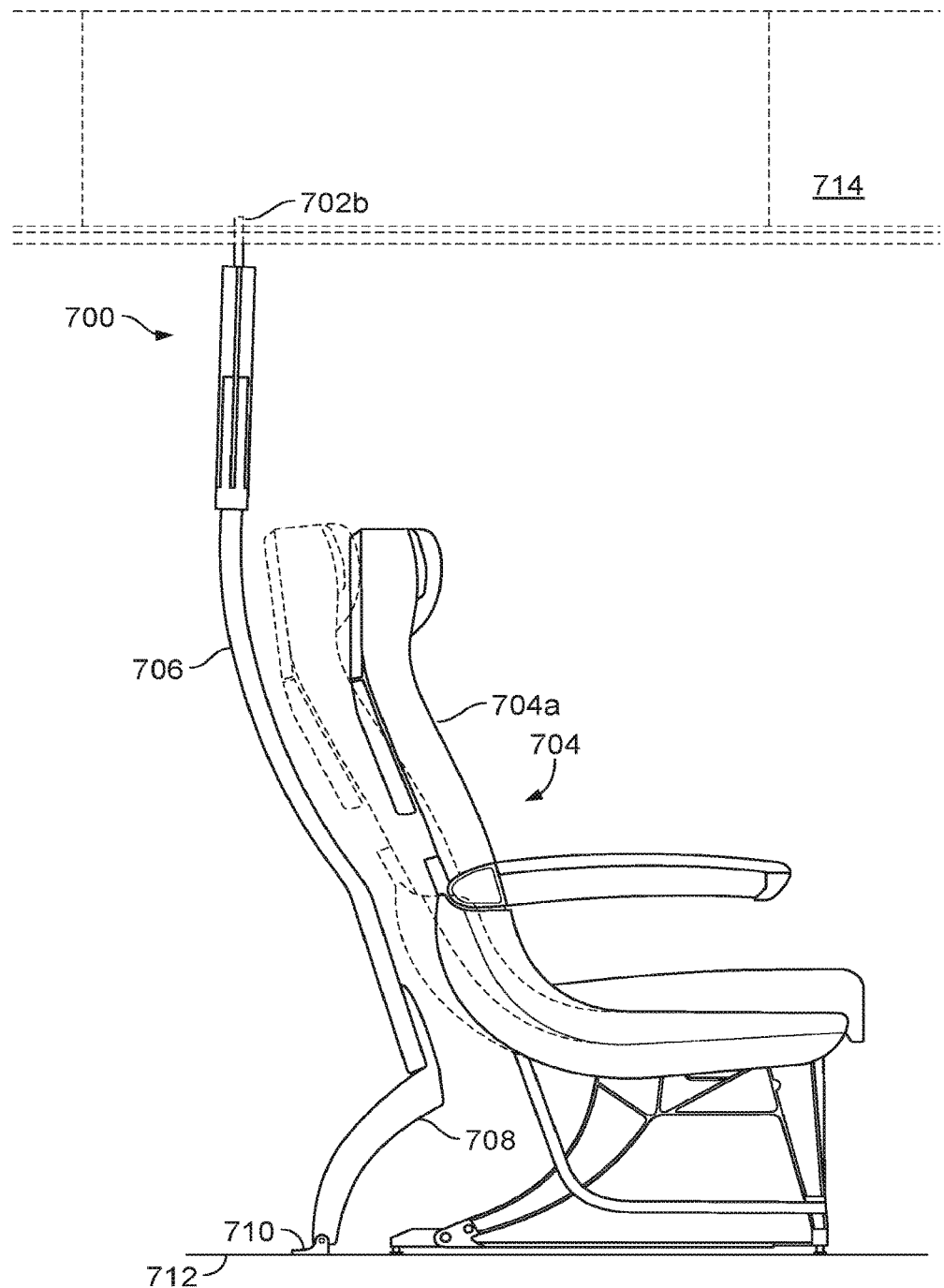
FIGS. 7A-7I illustrate side views of example contoured class dividers showing embodiments of articulation systems.

FIG. 7A is a side view of an example contoured class divider 700 shown the rearward position. The contoured class divider 700, for example, may be similar to the contoured class divider 10 illustrated in FIG. 4A. The class divider 700 includes a panel section 706 positioned between a storage bin region 714 and at least one leg 708, and a foot or floor mount 710. The floor mount 710, for example, may be a portion of the leg(s) 708 that is inserted in floor-mounted seat tracts 712. For example, as illustrated in FIG. 4A, the contoured class divider 700 may include a total of two legs 708 (e.g., such as legs 16 of class divider 10) and two feet 710. The passenger seat 704, as illustrated, may move from a upright position (illustrated in solid lines) to a reclined position (illustrated in dashed lines) where a seatback region 704a of the passenger seat 704 is nested proximate a curved area of the contoured class divider 700 while the seat is in a reclined position. Although illustrated as being positioned a distance away from the contoured class divider 700, in other embodiments, the contoured class divider 700 may be designed for load sharing between the passenger seat 704 and the panel section 706. In such configurations, the distance between the seat and the divider in certain operative configurations is less than one inch.

Figure 7B:
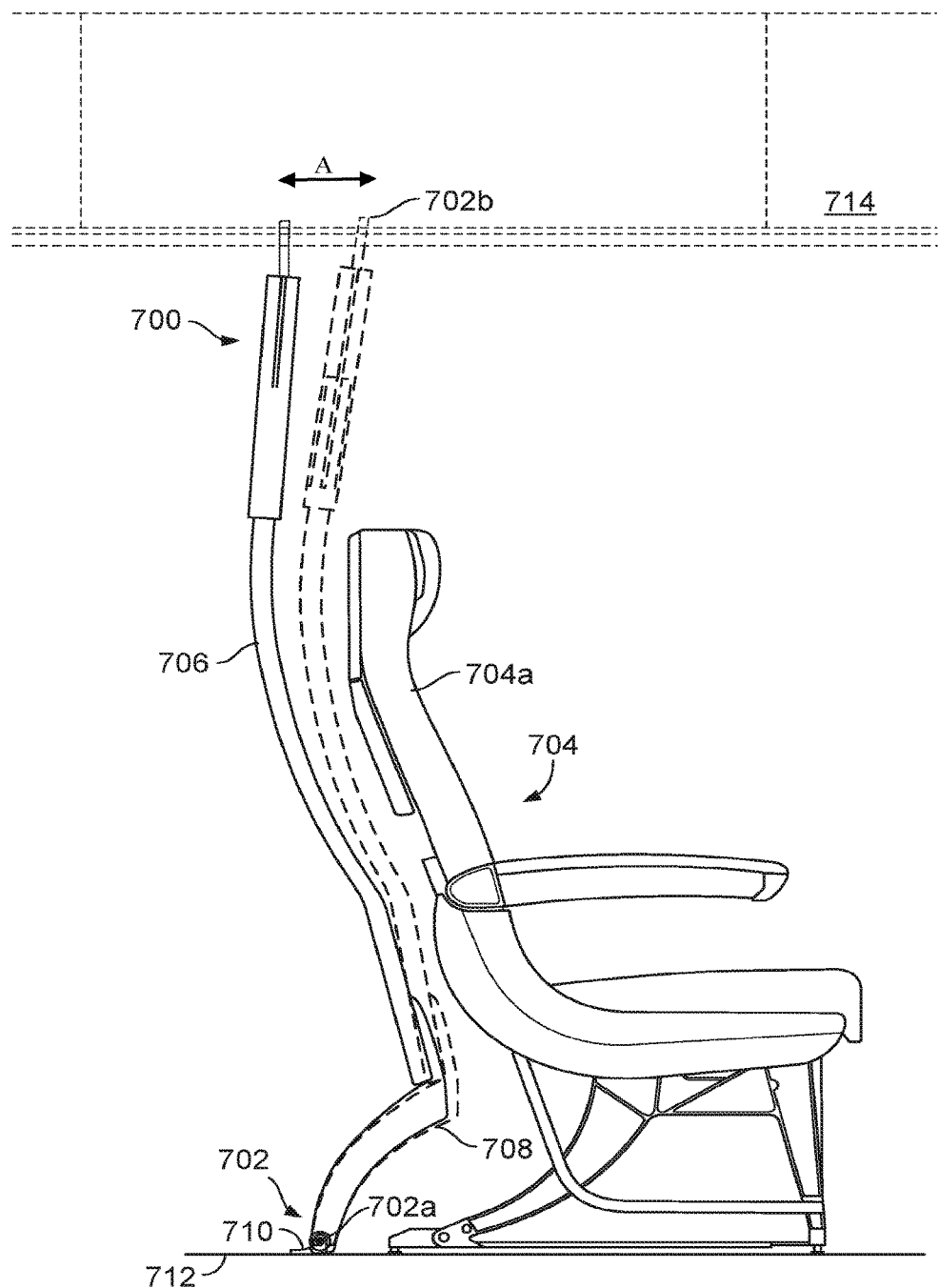

FIG. 7B is a side view of the example contoured class divider 700 in a rearward (solid lines) and forward (dashed line) positions. The seat 704 is shown in the upright or take-off taxi and landing (TTOL) position. The contoured class divider 700, in some embodiments, includes the articulation system 702 to articulate the divider 700 from a rearward position (illustrated in solid lines) to a forward position (illustrated in dashed lines). The articulation system includes a pivotable or hinged floor mount 702a and an upper connector 702b that moves between a forward and a rearward position. In the forward position, the space behind the forward positioned passenger seats, such as the passenger seat 704, may be minimized such that the divider 700 more readily meets the FAA's Head Injury Criterion (HIC) requirements for the passenger seats immediately aft the contoured class divider 700. While in the forward position (dashed lines), for example, increased space between a set of aft passenger seats (not illustrated) and the contoured class divider 700 may be outside of a conventional head path and impact zone (e.g., range of typical sized passenger head movement during an emergency deceleration). While in the rearward position (solid lines), in some implementations, the space aft the passenger seat 704 is adequate to provide clearance for conventional range of seatback recline for the passenger seat 704. For example, the forward position (dashed lines) can be used during a taxi takeoff landing (TTOL) phase or an emergency situation, e.g. anticipated impact, anticipated ditching, anticipated forced landing, while the rearward position can be used during a cruise phase. In another example, the divider may be placed in the forward position (dashed lines) only in emergency circumstances only.

The articulation of the contoured class divider 700 from the rearward position (solid lines) to the forward position (dashed lines), in some implementations, is configured to increase seating capacity and space for other cabin amenities while conforming to HIC requirements. The contour and/or articulation of the contoured class divider 700 may enable the main cabin seats positions immediately aft the contoured class divider 700 to be moved forward up to an amount roughly equal to or slightly greater than the amount of recline available on the forward seat 704 inches (towards the contoured class divider 700) due to the increased clearance provided by the contour and/or articulation of the class divider 700. This may in many cabin configurations enable the insertion of an additional row of main cabin and/or premium cabin seats. Alternatively or additionally, the space savings provided by the class divider may alternatively be utilized to improve passenger comfort, as by enlarging the living space of for the passengers seated immediately aft of the divider or enlarging the living space in a number of rows (e.g., by increasing the seat pitch in the premium cabin, the forward portion of the main cabin, or the rear portion of the main cabin) without reducing the number of seats on the aircraft. Seat pitch is the distance between like points on seats juxtaposed fore and aft of one another.

In other embodiments, the divider 700 provides 1-12 inches of additional clearance, 2-10 inches of additional clearance, 3-9 inches of additional clearance, 4-8 inches of additional clearance, 5-7 inches of additional clearance or about six inches of additional clearance. As discussed herein below, up to an additional inch of clearance may be provided by positioning the seat and divider in close proximity (less than one inch apart) such that they share loads during normal operation and/or emergency landings.

The articulation system 702, in some implementations, includes at least one pivot mechanism 702a to enable articulation of the contoured class divider 700 from the rearward position (solid lines) to the forward position (dashed lines), and vice-versa, via a rotation or pivoting of at least the panel 706 of the contoured class divider 700 between the rearward and forward positions. The at least one pivot mechanism 702a can be placed at a predetermined position on the contoured class divider 700, in one example, to maximize the additional clearance generated by the articulation of the contoured class divider 700 from the rearward position (solid lines) to the forward position (dashed lines). As illustrated, for example, the at least one pivot mechanism 702a (such as a rotatable pin connection) can be placed on the leg(s) 708 at top part of the foot 710. The at least one pivot mechanism 702a for example, may be configured to rotate the panel 700 around a rotation axis substantially parallel to a floor of the aircraft cabin, as illustrated in FIG. 7B, providing a rotation range A of the contoured class divider 700. The positioning of the pivot mechanism 702a may in some embodiments dictate the contour of the divider in that the divider is shaped or contoured to closely follow the contour of the seat back. The rotation range A may be about 1-15 degrees, about 2-14 degrees, about 3-13 degrees, about 4-12 degrees, about 5-11 degrees, about 6-10 degrees, about 7-9 degrees or about 8 degrees.

In some embodiments, the articulation system 702 further includes a locking mechanism 702b for locking the contoured class divider 700 in either the rearward position (solid lines) or the forward position (dashed lines). The locking mechanisms are discussed in greater detail below in relation to FIGS. 8A-C.

As mentioned above, the divider may be positioned in the rearward position at all times until an emergency landing occurs. The declarative force of the emergency landing moves the divider to the forward position without interfering with the seat because the seat will be in the TTOL position during an emergency landing. This configuration advantageously provides full recline for the seat forward of the divider (in the first, business or premium cabin) while provide the aforementioned amounts of additional clearance.

In an alternative embodiment, the divider is routinely articulated between the forward and rearward positions by crew members. For instance, after reaching cruising altitude the crew may move the divider to the rearward position. In preparation for TTOL, the crew may move the divider to a forward position.

Figure 7C:
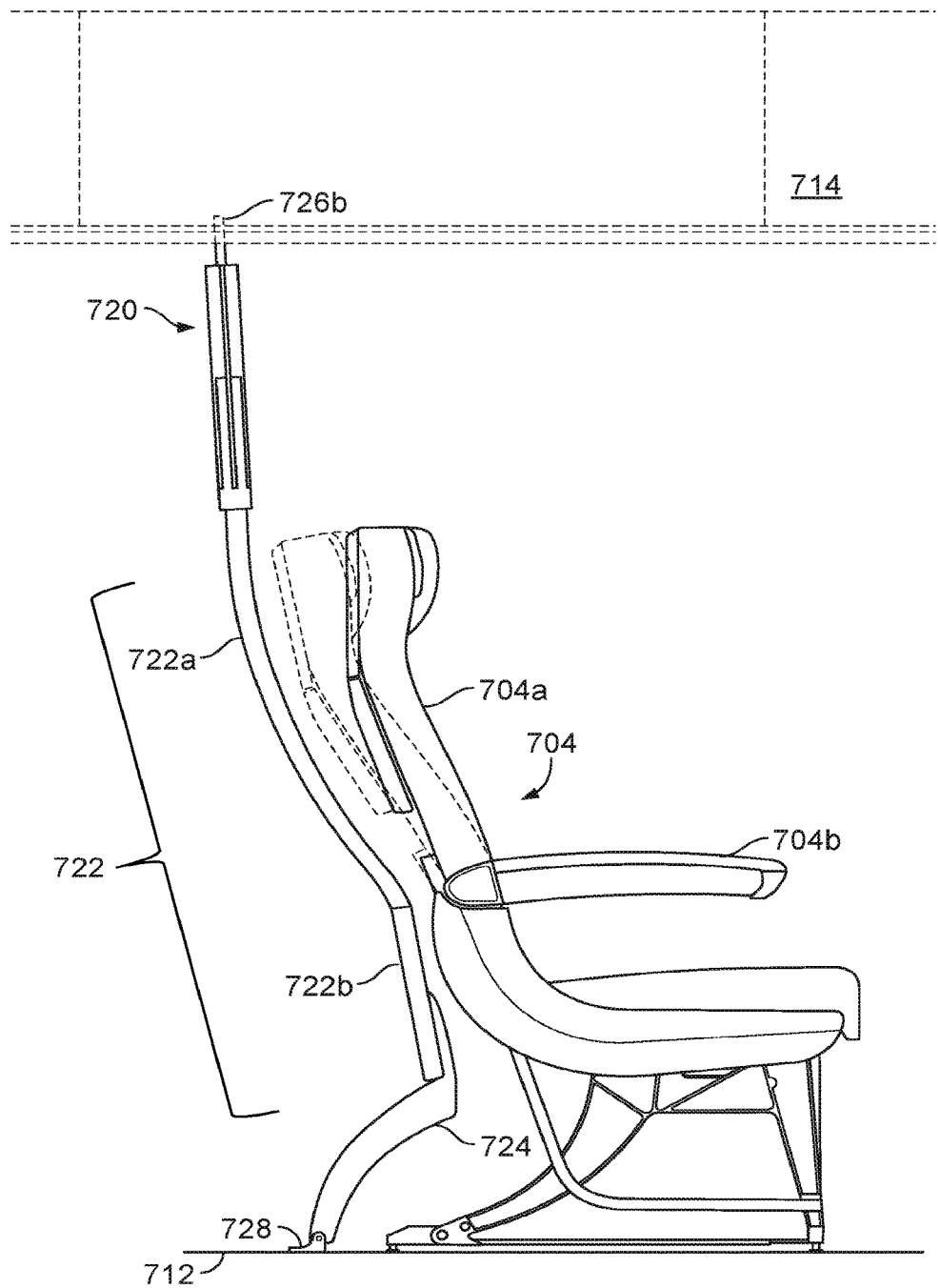

FIG. 7C depicts the functionality of the seat when the divider is in the rearward position. The seat 704 may fully recline in the depicted embodiment without coming within one inch of the class divider, thus obviating the need to design the seat and divider to share loads. The seat will be placed in the upright position during TTOL.

In some implementations, a contoured class divider 720, as illustrated in FIG. 7C, includes a panel section 722 positioned between the storage bin region 714 and at least one leg 724, and a foot 728. The foot 728, for example, may be a portion of the leg(s) 724 that is inserted in floor-mounted seat tracts 712. The panel 722 may be divided in an upper curved region (e.g., a first region, etc.) 722a and in a lower straight region (e.g., a second region, etc.) 722b. The passenger seat 704, as illustrated, may move from a forward position (illustrated in solid lines) to a rearward position (illustrated in dashed lines) where a seatback region 704a of the passenger seat 704 is nested proximate the upper curved region 722a of the contoured class divider 720. Although illustrated as being positioned a distance away from the contoured class divider 720, in other embodiments, the contoured class divider 720 may be designed for load sharing between the passenger seat 704 and the upper curved region 722a (e.g. as where the divider and seat are spaced less than one inch away from each other). As illustrated, the contoured class divider 720 is disposed between the seat tracts 712 of the cabin area and the bin region 714. In other implementations, the contoured class divider 720 may be fixed to other upper cabin area structures.

Figure 7D:
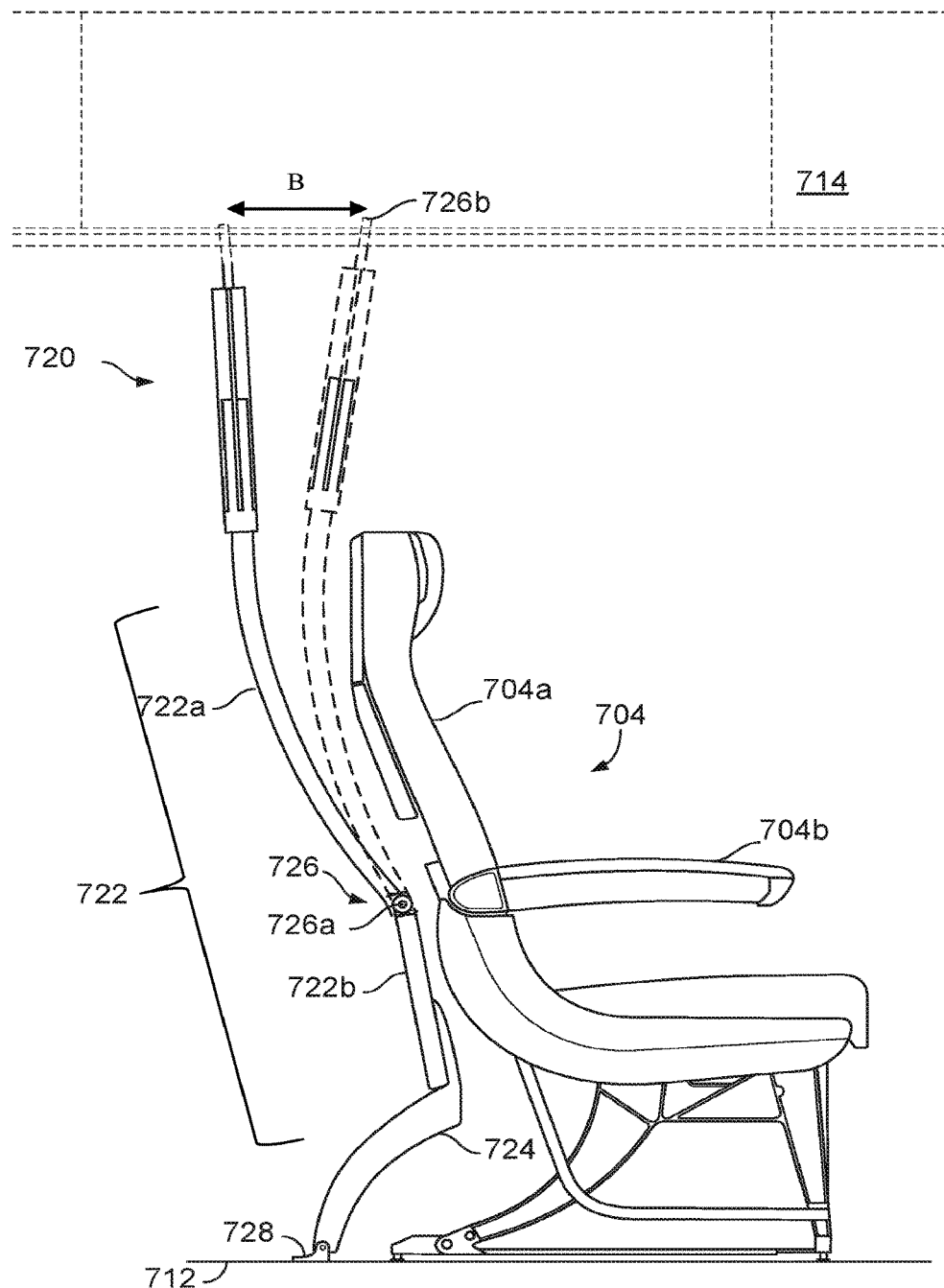

FIG. 7D shows an alternative embodiment in which the pivot point is mid-way up the panel (as opposed to at the floor mount). The articulation system 726, in some implementations, includes at least one pivot mechanism 726a to enable articulation of the contoured class divider 720 from the rearward position (solid lines) to the forward position (dashed lines), and vice-versa, via a rotation of at least the upper curved region 722a of the contoured class divider 720. The at least one pivot mechanism 726a can be placed at a predetermined position on the contoured class divider 720, in one example, to maximize a gain of space generated by the articulation of the contoured class divider 720 from the rearward position (solid lines) to the forward position (dashed lines). As illustrated, for example, the at least one pivot mechanism 726a can be placed at approximately the height of an armrest 704b of the passenger seat 704 (or mid-back region of the passenger therein).

The at least one pivot mechanism 726a for example, may be configured to rotate the upper curved region 722a around a rotation axis substantially parallel to a floor of the aircraft cabin, as illustrated in FIG. 7D, providing a rotation range B of the contoured class divider 720. The rotation range B may be about 2-20 degrees, about 5-15 degrees, about 7-12 degrees or about 10 degrees.

This configuration provides the advantage that the pivoting or rotating mass is reduced. This may permit the use of a higher strength (and heavier) panel construction or a lighter weight or lower strength connector mechanism. The mid-range positioning of the pivot mechanism 726a, for example, may be configured to lessen a load on the pivot mechanism 726a as opposed to the embodiment illustrated in FIG. 7A where the pivot mechanism 702a is located near the cabin floor. Moreover, this arrangement may more fully optimize usage of the space immediate aft of the seat base in the divider is more closely spaced to the lower portion of the seat even when the divider is in the rearward position. In addition, the rotation of the upper curved region 722a around the axis of rotation provided by the pivot 726a allows the lower straight region 722b to remain fixed, avoiding interference of the articulation of the contoured class divider 720 with items that may be placed below the panel 722 such as carry-on bags. An example recline range may be observed in the difference of position between the contoured class divider 720 in the forward position (dashed lines) and in the rearward position (solid lines).

Figure 7E:
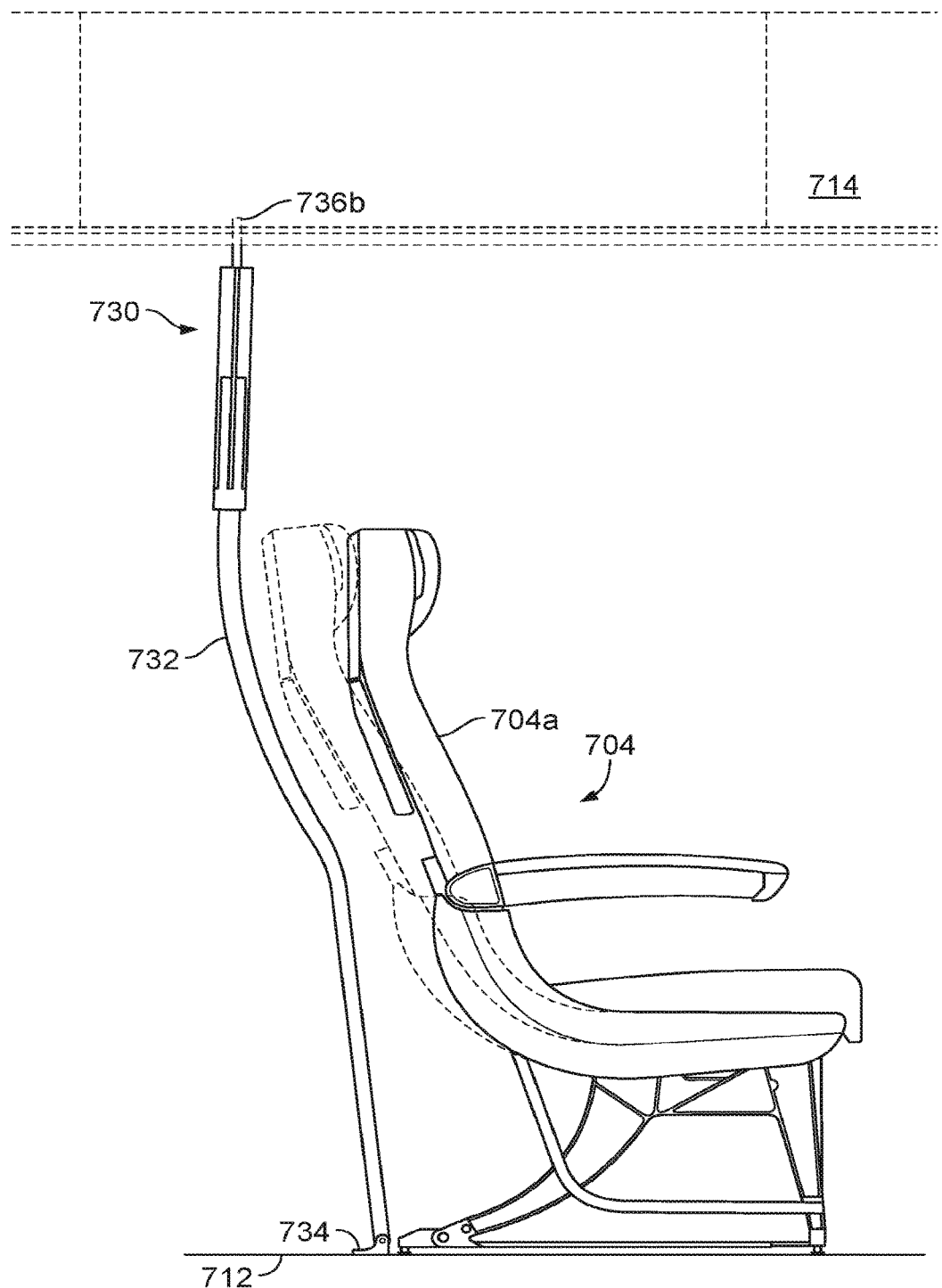

FIG. 7E illustrates a full height divider that prevents the passengers aft of the divider from placing their luggage under the seats 704. The contoured class divider 730, for example, may be similar to the contoured class divider 10 illustrated in FIG. 4A. This embodiment enhances privacy by more completely separating the main cabin from the premium cabin. This embodiment also provides for the storage of crew luggage, aircraft supplies and/or emergency equipment a cabinet or locker positioned in the gap just forward of the panel and behind the rear seat legs. The cabinet or locker (not shown) may be integrally formed with or rigidly attached to the panel. The recline of the seat is shown in dashed lines.

Figure 7F:
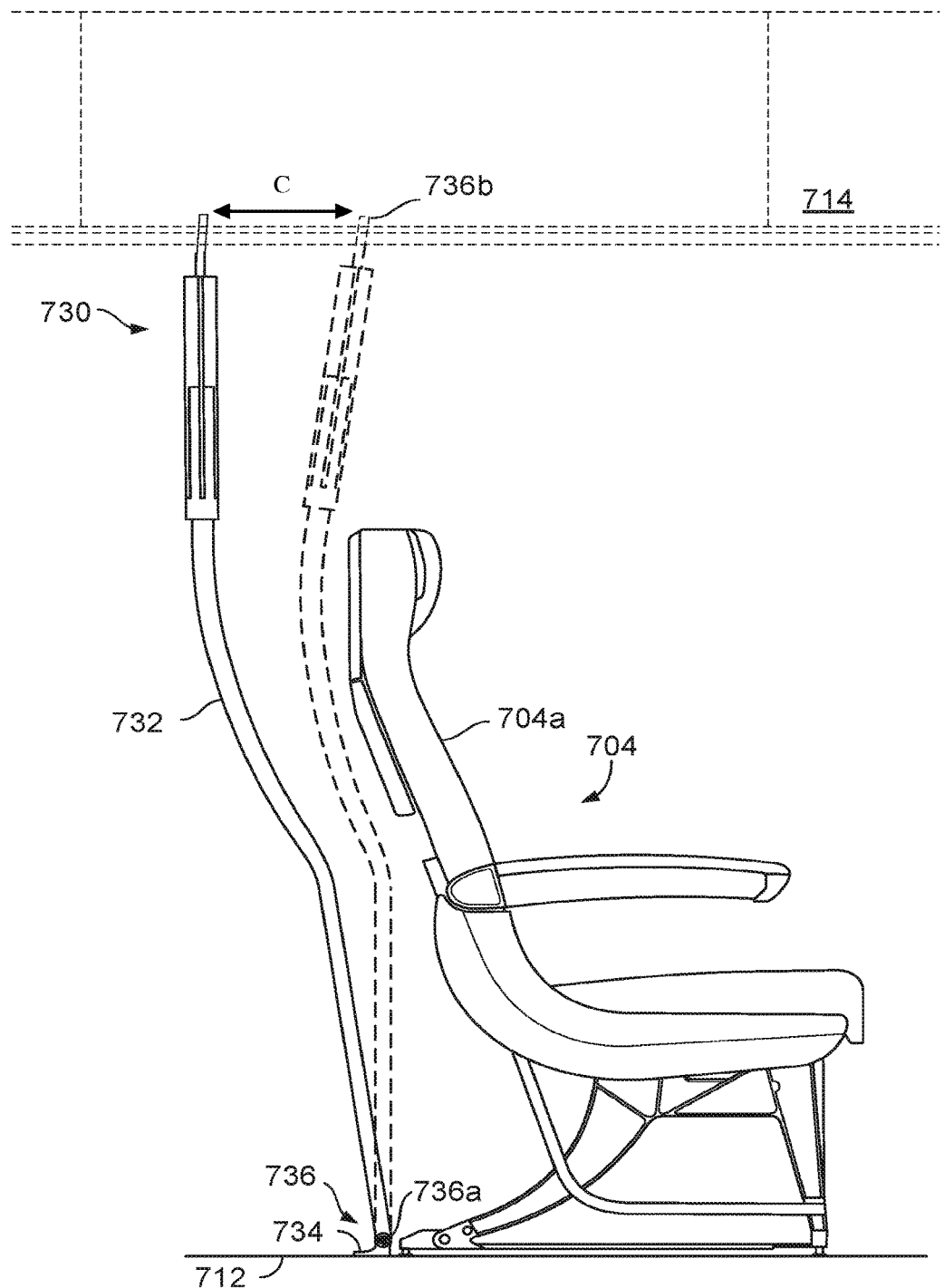

FIG. 7F shows the panel of FIG. 7E articulated between a rearward position and forward position. The seat 704 is shown in the TTOL position. As discussed above, the seat and divider may be placed closer together (within one inch) if the divider and seats are configured to share loads.

Figure 4B:
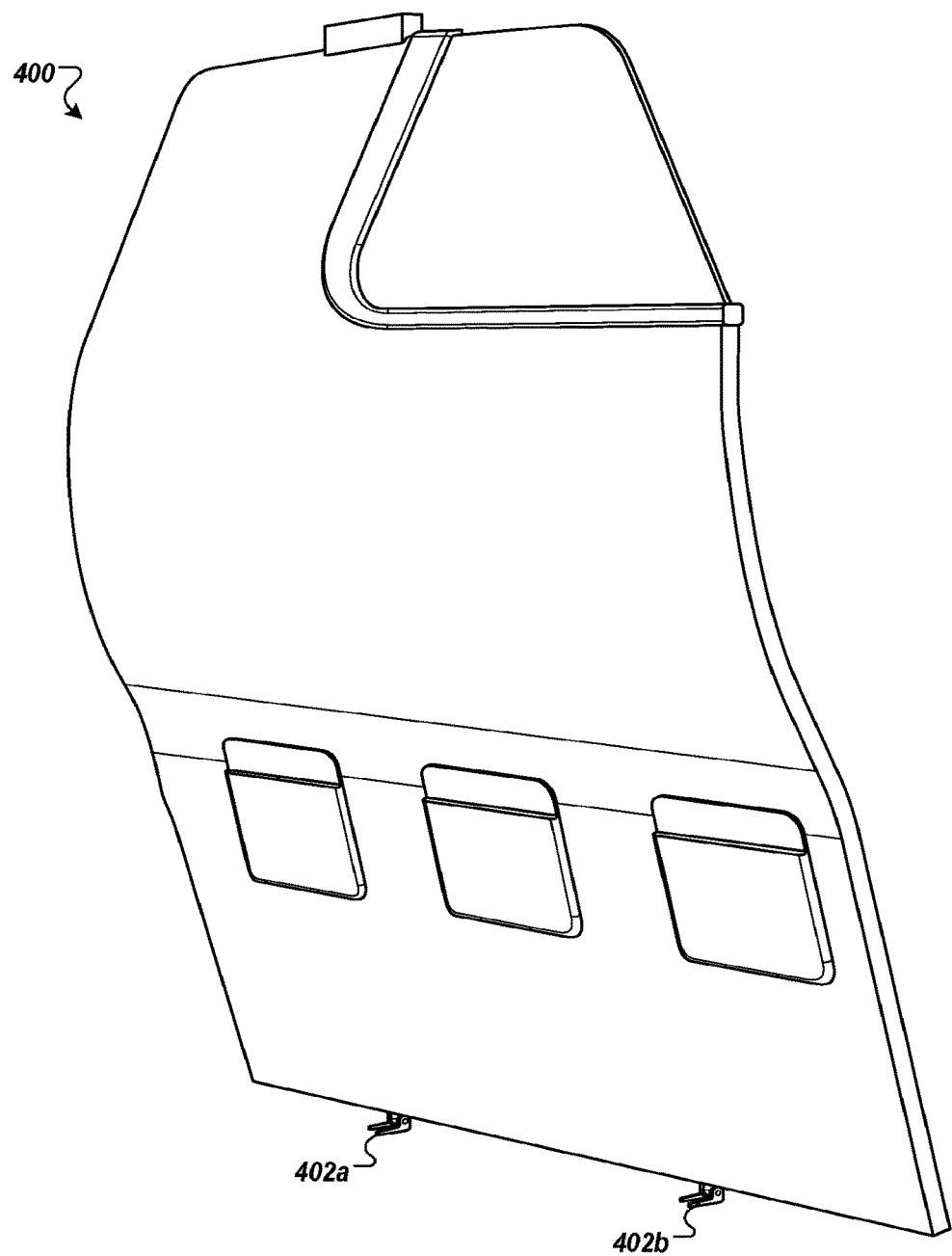
FIG. 4B is a forward perspective view of another example contoured class divider.

All of the functionality and features described above apply equally to the embodiment shown in FIGS. 7E-7F. In some embodiments, a top connector of an articulating contoured divider panel, such as the connector 20 illustrated in FIG. 4, is designed to interoperate with a locking system. The locking system, in some embodiments, is configured to lock the articulating contoured divider panel after articulation of the contoured class divider panel from a forward position to a rearward position or vice versa. In some embodiments, the locking system may be configured to automatically unlock in the event of a rapid deceleration event to allow articulation from a present position to a forward position, moving the panel away from potential impact with aftwardly positioned passenger seats.

Figure 7G:
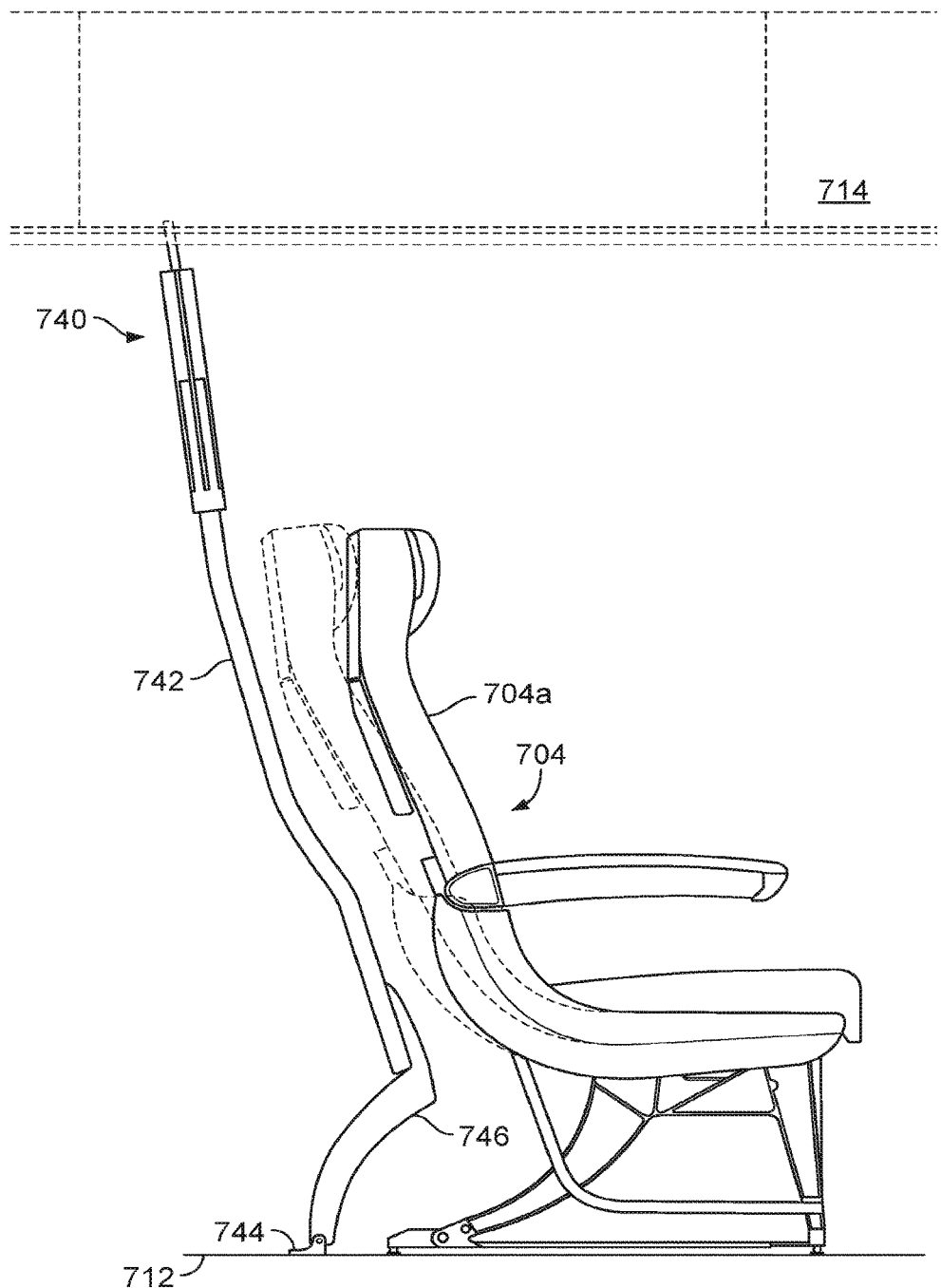
Figure 7H:
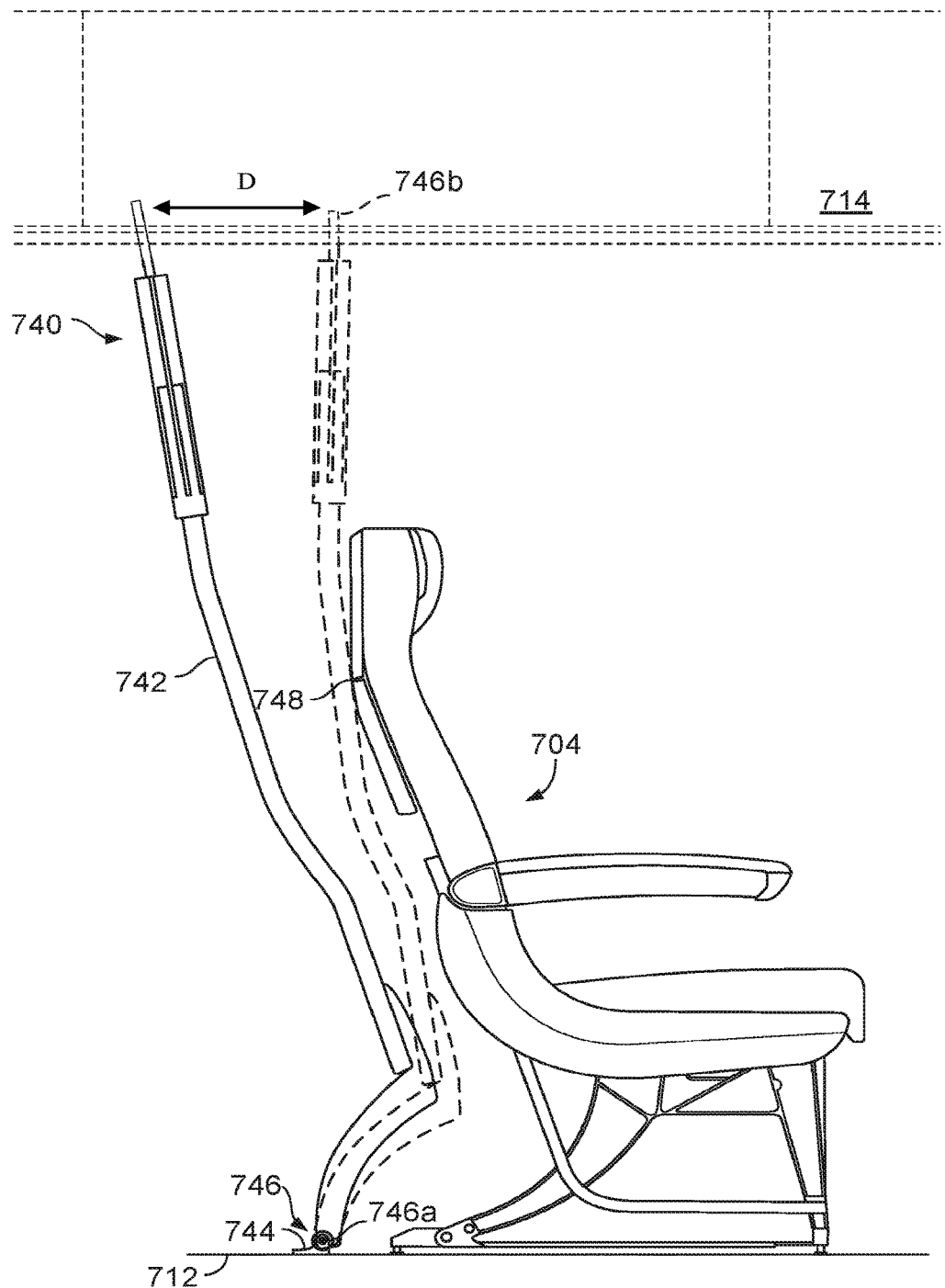
Figure 7I:
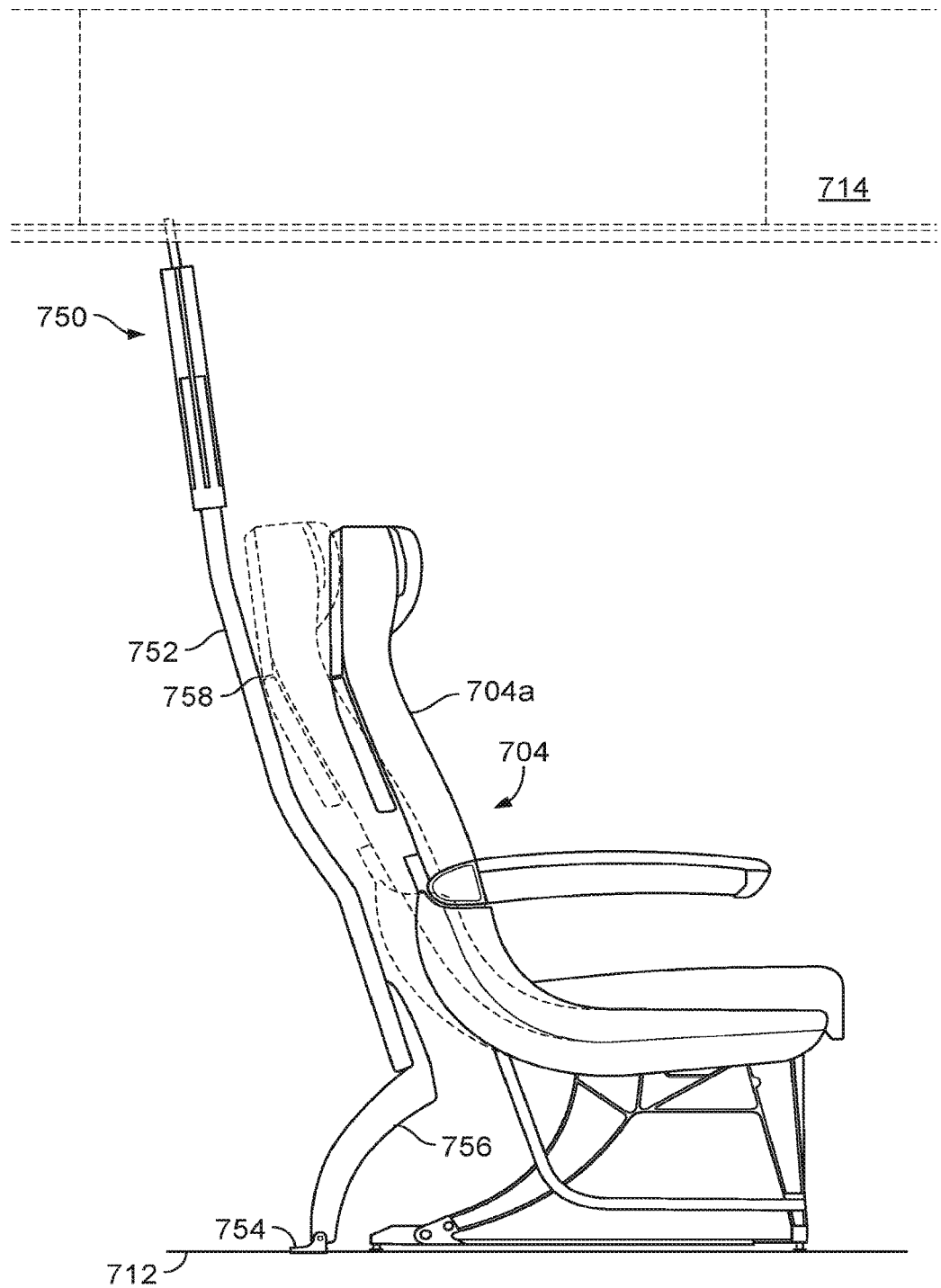

FIGS. 7G, 7H and 7I depict one embodiment which is design to "use" the last inch of clearance which is normally reserved to space apart components such that they do not have to be designed to share loads during normal use and/or emergency landings. The upper portion 752 of the panel has less curvature than the seat such that it will have a known point of impact 748/758 with the seat 704. The known point of impact 748/758, for example, can simplify load sharing simulations in the circumstance of the dynamic load of the panel section 742 meeting the passenger seat 704 in the event of an emergency situation. This may enable the divider to be placed up to an inch closer to the seat 704, thereby providing an extra inch of clearance which may be utilized in the manner described above. All of the functionality and features described above apply equally to the embodiment shown in FIGS. 7G-7I.

FIGS. 8A-8C illustrate a locking system 800, according to certain aspects of the disclosure. The locking system 800, in some embodiments, is designed to automatically move an articulating contoured class divider panel into the forward position from a rearward position when the aircraft cabin experiences a deceleration above an emergency deceleration threshold. The emergency deceleration threshold can correspond, in some examples, to a deceleration generated by a forced landing or turbulences and can be between 5 g-force (G) and 20 G, and particularly between 7 G and 13 G, and in some embodiments around 9 G.

The locking system 800, in some embodiments, includes a body 810 affixed to an overhead stowage bin (such as bin B illustrated in FIG. 1) or other structure above the passenger seats, a channel 812 in the housing 810, and a shear pin 814 inserted in a rounded end 816 of the channel 812 on one side and affixed to the contoured class divider panel on another side (e.g., such as the connector 20 of FIG. 1). The channel 812, as illustrated, includes enlarged ends 816 connected by a narrower channel region 812. The channel 812 can have a curved shape with a minimum width D, smaller than a diameter of the shear pin 814 such that the pin 814 is prevented from travel along the channel 812. The channel dimensions and friction coefficients are selected configured such that a predetermined force corresponding to the emergency deceleration threshold will move the shear pin 814 from the first end 816a to the second end 816b by causing the material of the housing 810 surrounding the channel 812 to deform. In selected embodiments, the shear pin is a single use item and must be replaced after it is actuated because during actuation the pin and/or body deform or have material sheared off their surface(s). After that occurs, the locking system 800 may no longer activate at the same predetermined force.

In other implementations (not shown) the body permits the pin to move axially from the first end 816a and to the second end 816b via manual actuation by a cabin attendant. For example, to prepare for TTOL, the cabin attendant may retract a spring-loaded pin downwards out of an aperture in the housing, articulate the contoured class divider from a rearward position to an upright position, and shift the pin upwards to lock it within a corresponding aperture of the housing. In other embodiments, a manual latch mechanism may releasably retain the pin in the two desired positions. The manual latch may be actuated by a handle disposed on the underside of the overhead bins. The latch and handle may be connected via a cable.

Returning to the embodiment depicted in FIGS. 8A-8C, when the deceleration generated by the emergency is higher than the emergency deceleration threshold, the deceleration generates a force on the articulating contour class divider panel that overcomes the predetermined force, i.e. the force required to overcome the friction between the channel 812 and the pin 814. The force generated on the panel 12 slides the pin 230 along the channel 812 and articulates the contoured class divider 10 from the inclined position and to the upright position. The force generated by the panel during deceleration is a function of its mass and, to a lesser extent, the angular range of motion through which the pin travels. Depending on the density of the panel, the pivot point may be moved mid-way up the divider to provide the desired predetermined force.

When the deceleration generated by the emergency is lower than the emergency deceleration threshold, the deceleration generates a force on the articulating contoured class divider panel that is too weak to overcome the predetermined force, and the pin 814 cannot slide along the channel 812. The pin 814 stays at proximity of the first end 816a and the contoured class divider panel is maintained in the rearward position.

In other embodiments (not shown), a spring-loaded latch is used to retain the pin in a the rearward position until the spring latching force is overcome by the predetermined force, at which time the pin moves forward and its received and retained by another latch. In another variation the pin is permanently biased in the rearward direction. During deceleration the pin moves forward and when it reaches the front of the channel it is retained and locked into place with a latch. In still other embodiments, a spring may forwardly bias the pin which is held in the rearward position by a latch. A solenoid may release the pin when an accelerometer detects a predetermined amount of deceleration. At that time the spring moves the pin forward in the channel and another latch receives and retains the pin at the forward end of the channel. In still further embodiments, electro-magnets may be used to hold the pin in place and/or repel a magnetic pin in the desired direction when an accelerometer detects a predetermined amount of deceleration.

In some implementations, an articulating contoured class divider locking system is designed to provide a fixed position panel except in the event of an emergency. The fixed position panel may be configured to withstand a static load meeting or exceeding a dynamic load threshold. Upon exceeding the dynamic load threshold (e.g., indicative of an emergency deceleration condition or other abrupt force), the locking system may release to provide additional clearance for passengers and to avoid passenger injury. In an illustrative example, the locking system may be designed to support static loads of 9 G while remaining in locked position. In the event of a dynamic load of about 16 G or greater, however, the primary locking mechanism of the locking system will release, and the panel will move into a secondary locking position, thus dissipating the inertial load by allowing the panel to shift forward in a controlled manner. For example, in some embodiments, the locking system can automatically articulate the contoured class divider from the inclined position to the forward position when a deceleration generated by an emergency, e.g. a series of turbulences, a forced landing, a sudden braking, or other accident.

A contoured class divider, in some implementations, may vary substantially in weight depending upon a deployment configuration. For example, the contoured class divider may be configured to hold one or more video monitors, pockets filled with reading materials or other passenger convenient items, and/or passenger storage area. In a particular example, a baby bassinet or other child seating configuration may be suspended from the contoured class divider. In these circumstances, it may be desirable to move the pivot point up to the middle of the panel as shown in FIG. 7D. Moreover, a purely mechanical solution for releasing the contoured class divider from its rearward position to an emergency forward position may lack a desired level of precision due to the variability of static weight on the contoured class divider in various applications. In such embodiments one of the electrically triggered mechanisms may be used to actuate the contoured class divider from its in-flight rearward position to the emergency forward position. In one example, a signal from an accelerometer may release a latching mechanism, allowing the contoured class divider to shift forwards under the bias of a spring. The signal, for example, may be received from an accelerometer in the seat, proximate the locking system in the overhead bin, or in the cockpit.

Figure 9A:
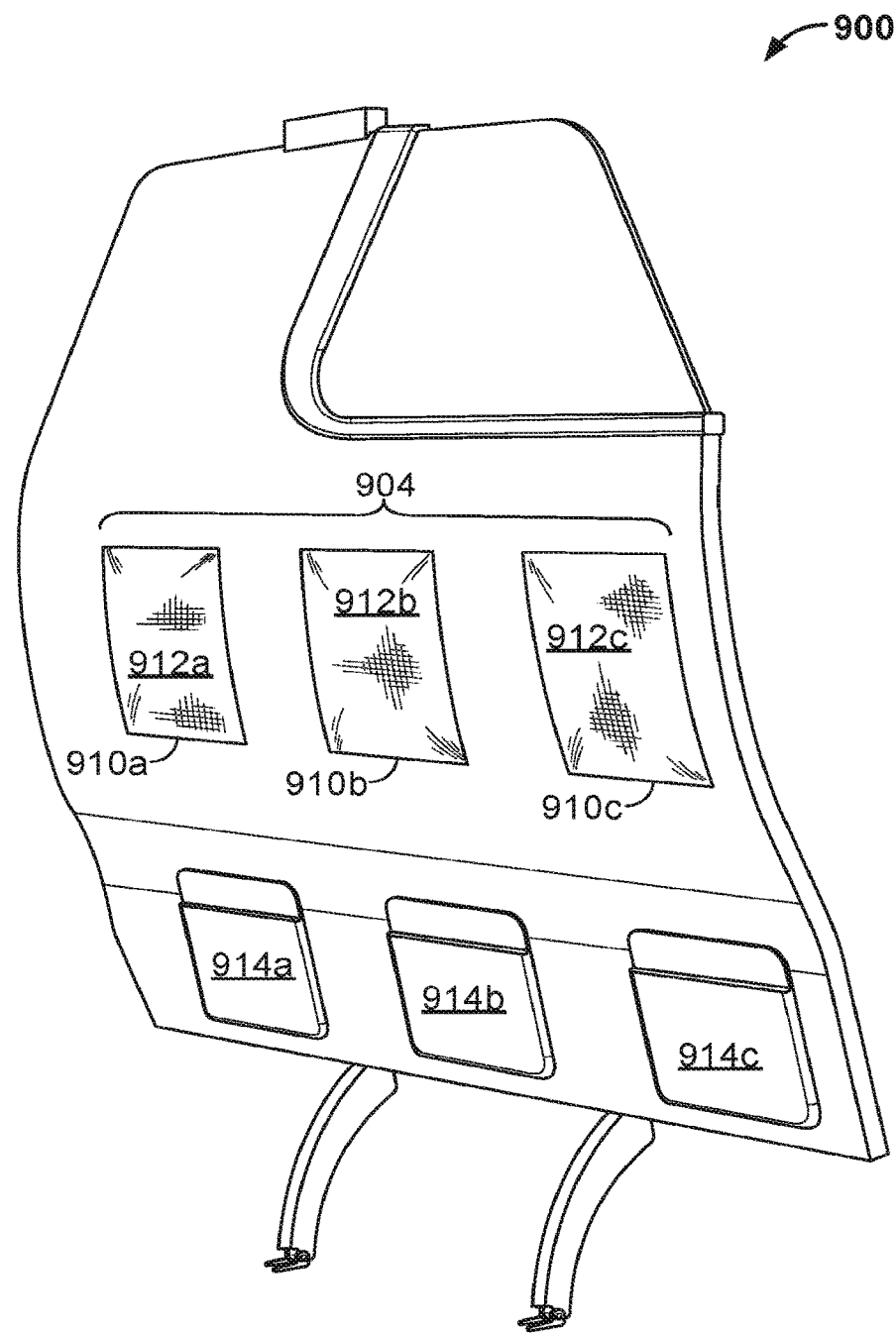
FIGS. 9A-9C are forward perspective views of example contoured class dividers with a head impact zone protection feature.
Figure 9B:
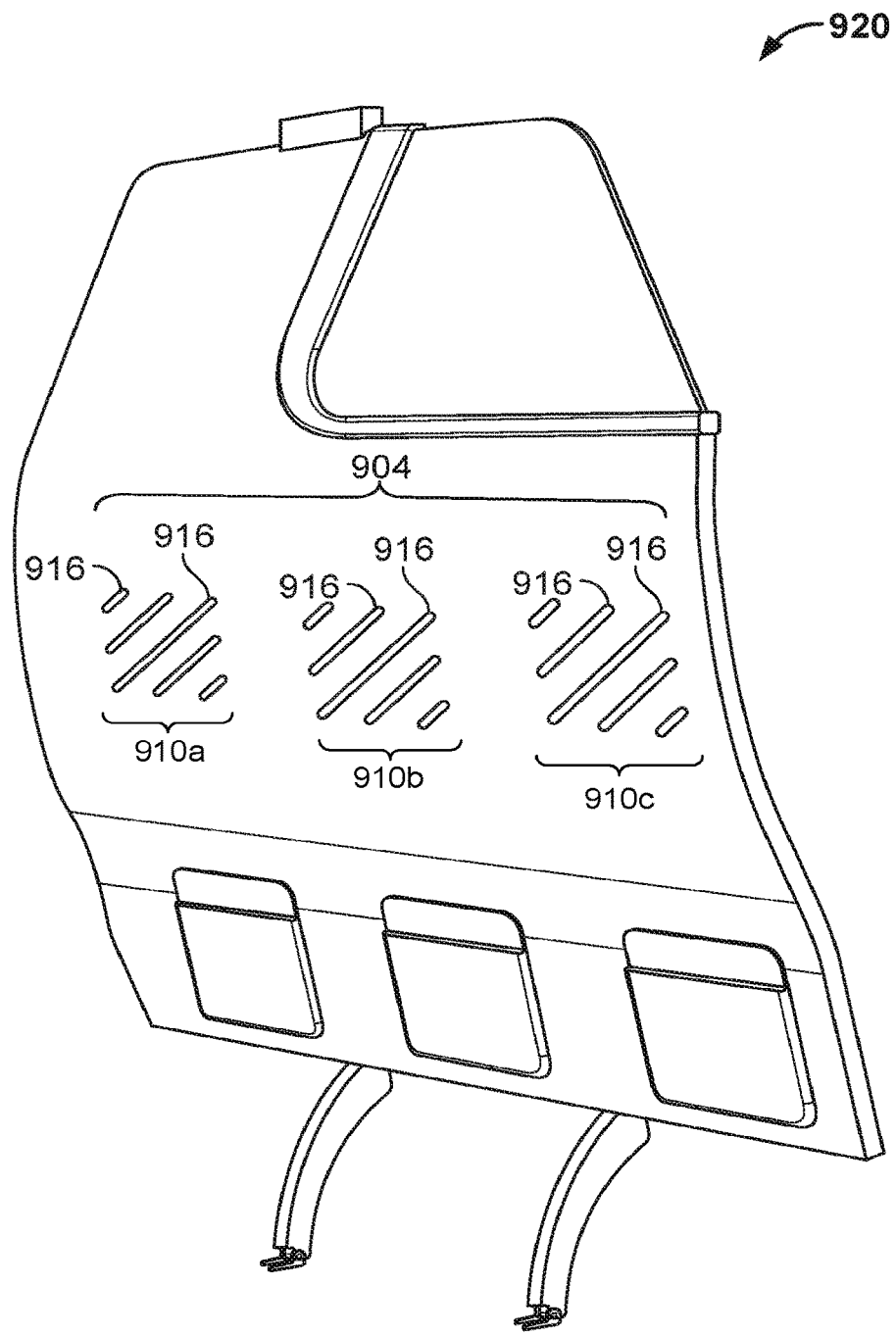
Figure 9C:
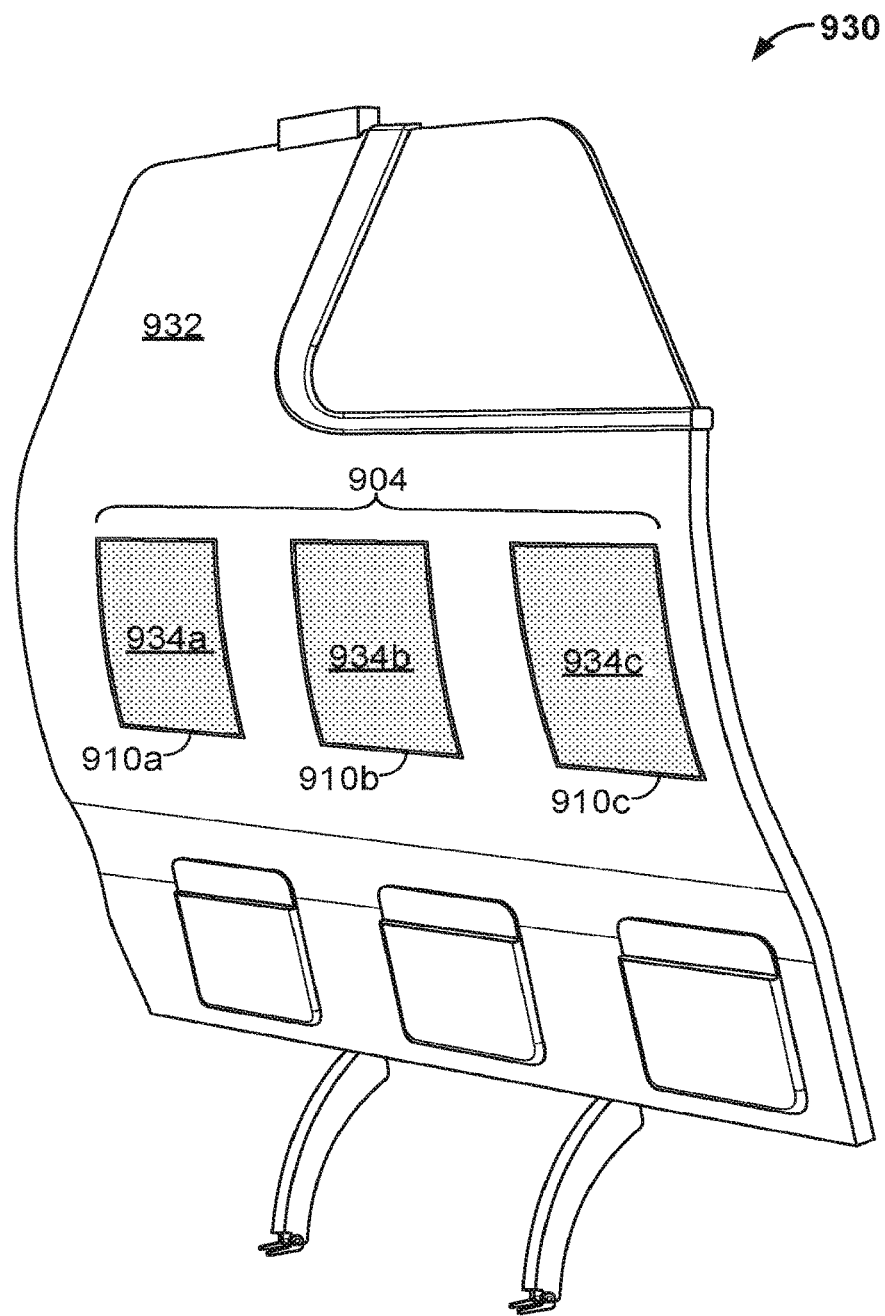

Turning now to FIGS. 9A-9E, a contoured class divider may be designed with weakened structural integrity within a head impact zone to further protect passengers seated to the aft of the contoured class divider in the event of an emergency landing. FIGS. 9A through 9C illustrate forward perspective view of embodiments of contoured class dividers with an enhanced head impact zone 904 for increased passenger safety. Particularly, the head impact zone 904 can be configured to limit a head impact shock between a head of the passenger and the panel of the contoured class divider through use of one or more energy absorbing zones having a predetermined location to face the head when the passenger is in a brace position, e.g. the head on the knees of the passenger.

Turning to FIG. 9A, a series of energy absorbing zone(s) 910 of a contoured class divider 900 can each include a core having slots cut therein and covered by a fabric 912, such as a stretched tissue. The fabric 912, in some examples, can have a similar appearance, texture, and or color as the surrounding surface of the contoured divider panel. In another example, the fabric 912 may be stretched to cover a wider portion of the contoured class divider panel 902 including the energy absorbing zone(s) 910. In a particular example, the fabric 912 may be positioned above a set of pockets 914 and up to the upper region of the panel 902 interfacing with the storage bins or other ceiling structure (not illustrated), as well as across a full width of the contoured divider panel 902. The fabric 912, in some embodiments, can have a predetermined surface tension sufficiently high to have a rigid surface appearance but sufficiently low to deflect when the head impact shock happens. Alternatively, the panel 902 may be composed of layered materials such that one or more interior layers of panel material is removed at the energy absorbing zone(s) 910 and an exterior layer of the panel 902 is intact across the energy absorbing zone(s) 910.

Turning to FIG. 9B, in some embodiments, each energy absorbing zone 910 of a contoured class divider 920 includes perforations or other apertures or cavities in the panel core material to weaken the structural integrity of a contoured divider panel 922 at the energy absorbing zone(s) 910. For example, each energy absorbing zone 910, as illustrated, may include a number of slots 916 machined on the panel 922 to weaken the panel 922. Further, a material such as stretched tissue, as discussed in relation to FIG. 9A, may be positioned, in some implementations, to cover at least the energy absorbing zone(s) 910 to mask the perforations, apertures or cavities in the panel 922.

Turning to FIG. 9C, as illustrated in relation to a contoured class divider 930, in some embodiments, each energy absorbing zone 910 of a contoured class divider 920 includes a cushioning material 934 replacing or partially replacing the panel material of a contoured panel 932. The cushioning material 934, for example, can include a foam material, a mesh material, and/or a flexible material forming a plurality of pockets filled with air and/or gel. Further, a material such as stretched tissue, as discussed in relation to FIG. 9A, may be positioned, in some implementations, to cover at least the energy absorbing zone(s) 910 to mask the cushioning material 934 inserts.

Alternatively, the head impact zone 904, in some implementations, can be configured to avoid contact between the passenger and the contoured panel. For example, the head impact zone 904 can include individual recesses (not illustrated) sufficiently curved forwardly to avoid contact between the head of the passenger and the contoured class divider panel. The embossments, in some implementations, may be covered with a material such as a stretched tissue to mask the embossments.

A skilled artisan will understand that in certain cabin configurations the passengers seated immediately aft of the divider will be positioned sufficiently far away from the divider such that their heads will not impact the divider during an emergency landing. In such configurations the energy absorbing zones can be omitted or rather included to provide an additional measure of safety.

Figure 9D:
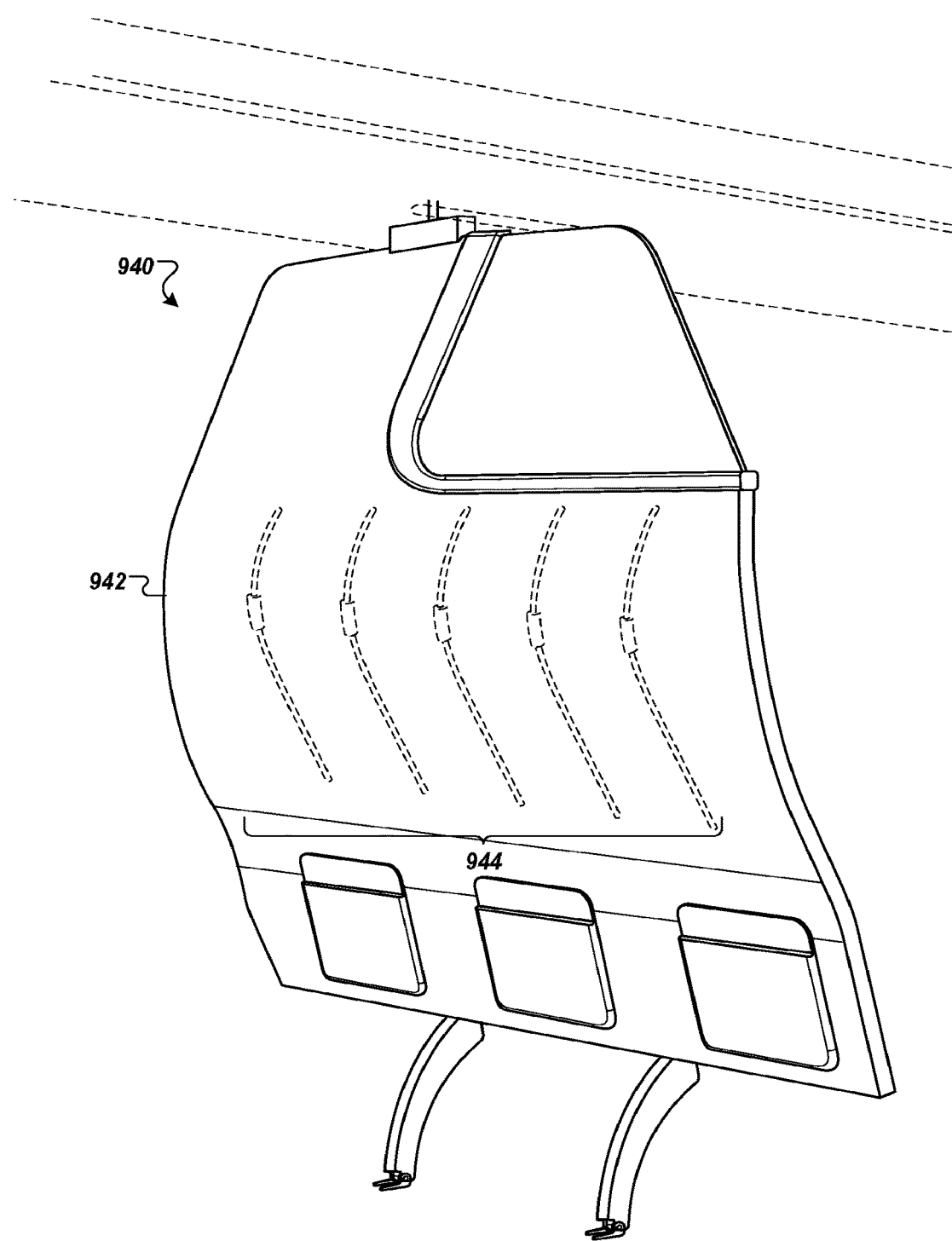
FIGS. 9D-9E are forward perspective views of an example contoured class divider with another head impact zone protection feature.
Figure 9E:
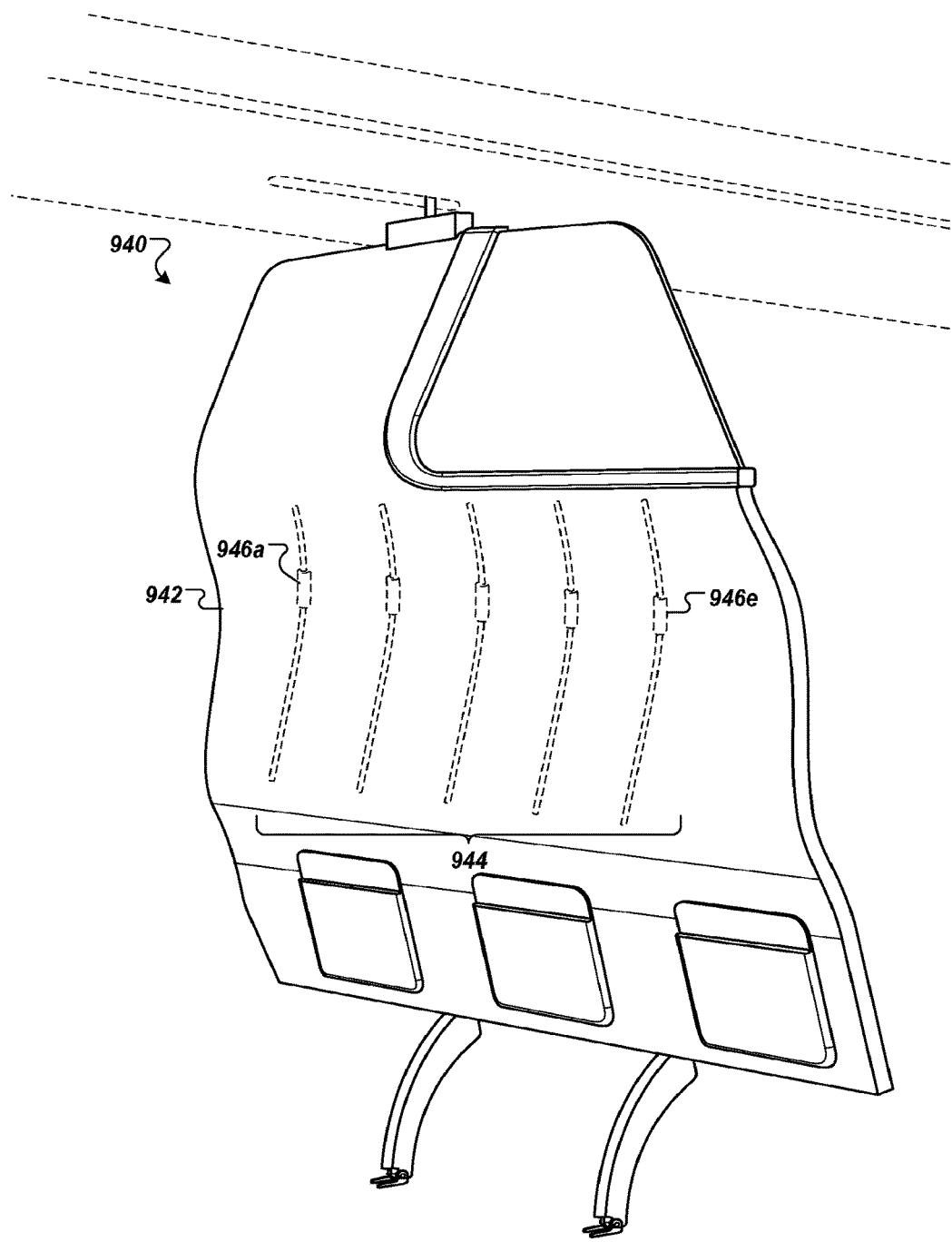

Turning to FIGS. 9D and 9E, in some implementations, a curved panel portion 942 of a contoured class divider 940 includes a series of flexible reversibly-jointed ribs 944 maintaining a convex profile of the contoured class divider 940, as illustrated in FIG. 9D. The ribs, in some examples, may be designed using materials having sufficient tensile strength and rigidity to withstand a load imposed by a large adult passenger (e.g., up to 300 pounds). In some examples, the materials may include titanium, aluminum, plastics. etc. However, upon a sufficient dynamic load impact such as a dynamic load created by passenger head impact with the panel 942, the flexible reversibly-jointed ribs 944 may reverse the convex jointed orientation. For example, as illustrated in FIG. 9E, the ribs 944 may reverse their joint orientation, causing the panel 942 to warp to a concave orientation. In some embodiments, the panel 942 may be designed using sufficiently flexible material to allow for warping of the panel 942.

This embodiment provides the advantage that the divider may be moved entirely out of the range of the passengers' heads. Alternatively, this approach may be used in combination with an energy absorbing zone to minimize the extent and force of the impact with the passengers' heads. To further protect the passengers seated behind the contoured class divider 940, in some embodiments, the flexible reversibly-jointed ribs 944 may be designed to lock into and maintain the concave position upon impact. For example, by preventing return to the convex orientation, the passenger's heads may be spared a bounce-back impact by the ribs 944.

In some implementations, rather than depending upon a dynamic load impact to reverse the orientation of the reversibly-jointed ribs 944, the ribs may include a dynamic load trigger. In one example, a load sensor built into the locking mechanism at the top of the contoured divider panel may both release the contoured divider panel from its rearward position and trigger reversal of the reversibly-jointed ribs 944. In a particular example, a hinge 946 of each rib 944 may surround an inflatable material such as an inflatable tube. By forcing air into the inflatable tubes, for example, the hinge mechanism holding the ribs in the present orientation may be broken, causing the ribs to reverse orientation and thereby assume the concave orientation.

Figure 10A:
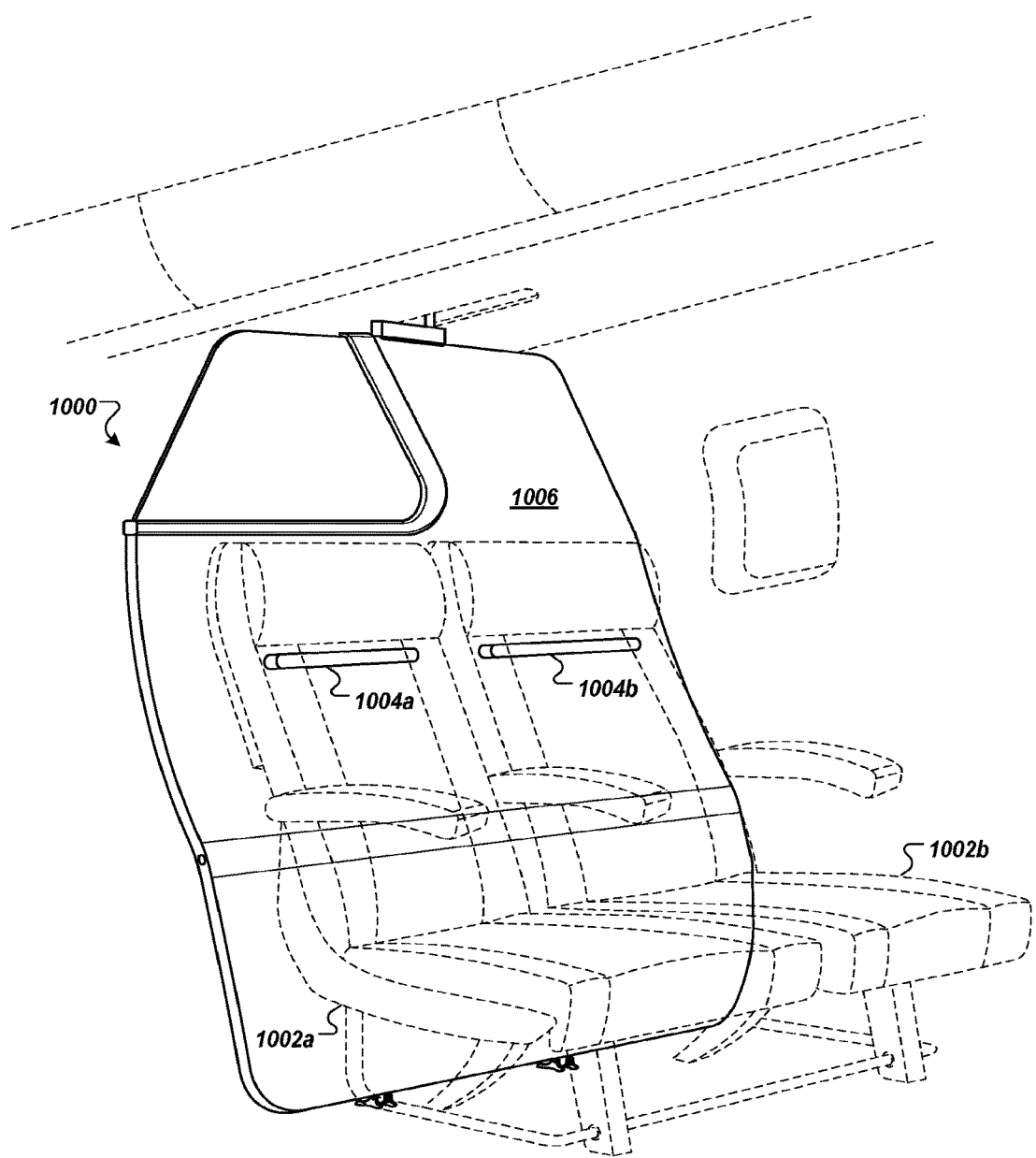
FIGS. 10A-10C illustrate example impact protrusion configurations for establishing an impact zone between a contoured class divider and forward-positioned seats.
Figure 10B:
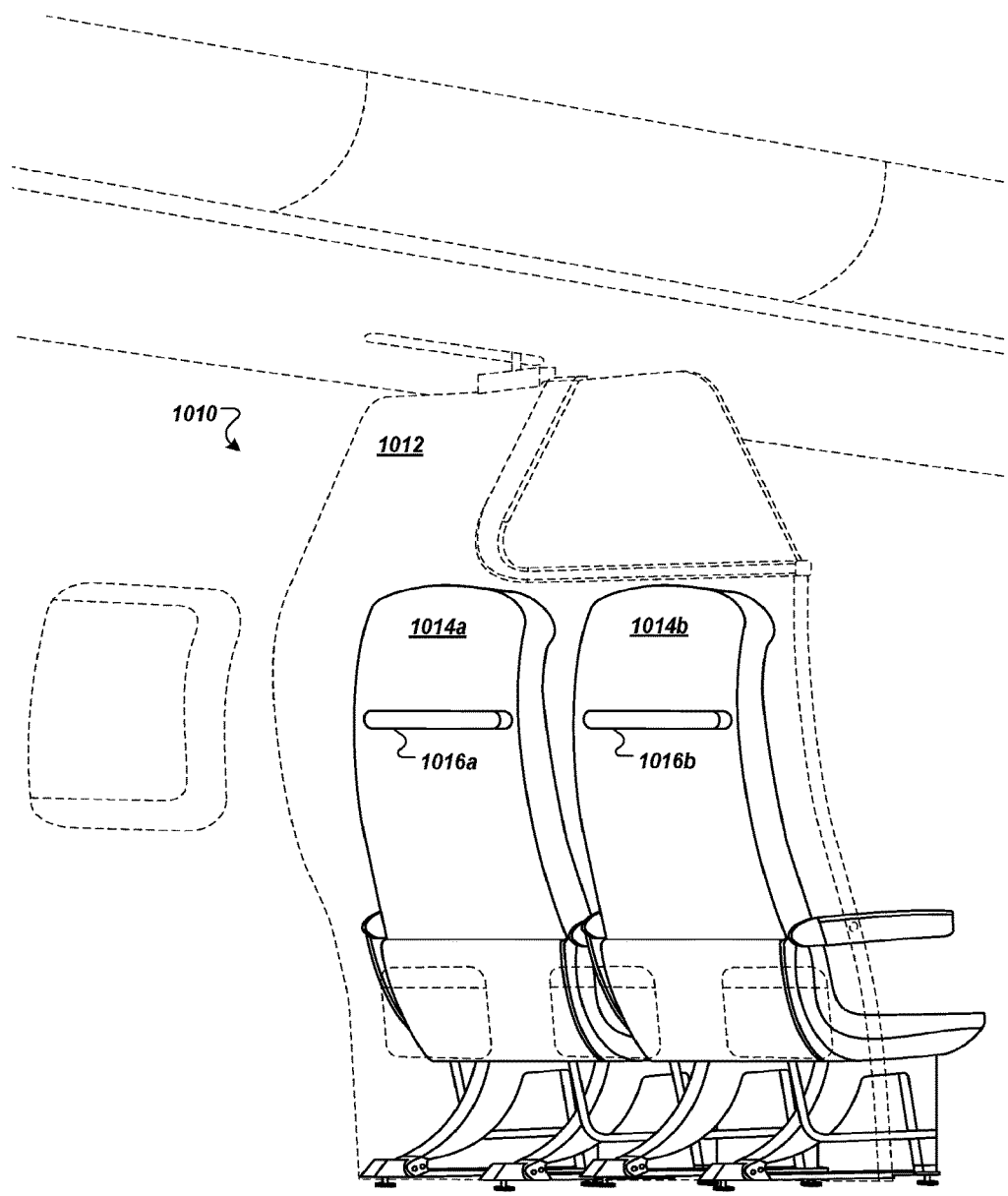
Figure 10C:
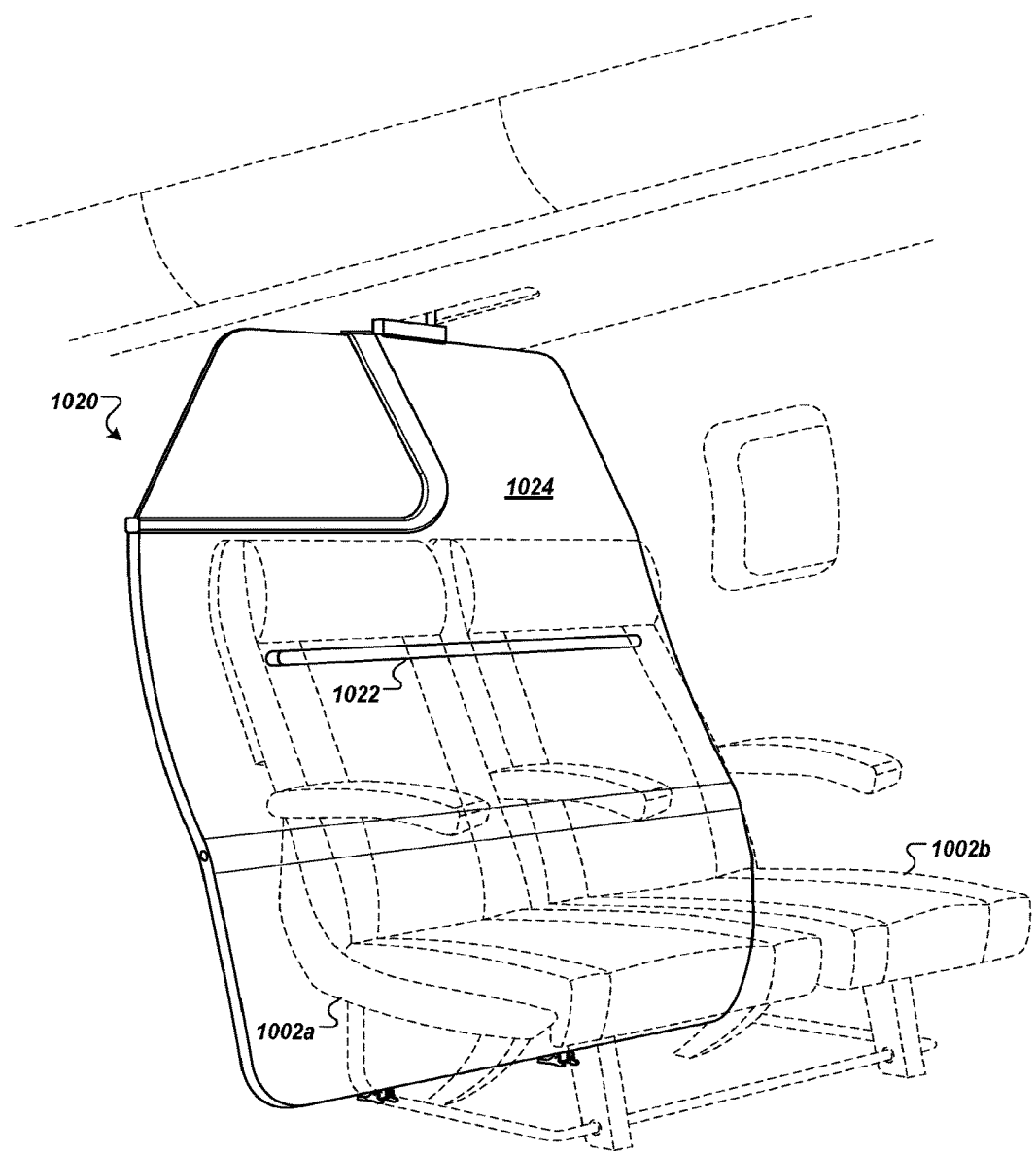

FIGS. 10A-10C illustrate alternative embodiments having known points of impact between the divider and the seats which permits determination of load sharing and thereby permits "use" of the last inch of clearance between the divider and the seats. In some embodiments, a contoured class divider panel includes one or more impact protrusions positioned on a fore surface of contoured class divider panel facing the seatbacks of the aft passenger seats such that at least one protrusion corresponds to each passenger seat back, providing known impact points between the contoured class divider panel and the seat backs when the contoured class divider panel contacts the passenger seats due to a strong deceleration, e.g. above 10 g. The impact protrusions, for example, may be used to provide predictable impact characteristics by identifying known localized impact points between the fore passenger seats and the contoured class divider. Thus, the impact protrusions may simplify impact predictions in meeting regulation requirements for design of the contoured class divider. This may be especially important in a contoured class divider panel which remains nested closely to, if not abutting, the fore passenger seat backs. For example, by providing the impact protrusions for load-sharing modeling purposes, a seating arrangement including a contoured class divider may be designed with a gap between the contoured class divider and the fore passenger seat(s) of less than about one inch, or even less than one inch.

FIGS. 10A and 10C are aft perspective views of contoured class dividers 1000, 1020 incorporating impact protrusions at approximately a shoulder height of a passenger (e.g., below a headrest of the passenger seats 1002). Turning to FIG. 10A, the contoured class divider 1000 includes a set of impact protrusions 1004a, 1004b, each impact protrusion positioned behind a respective passenger seat 1002a, 1002b. In this manner, a weight of material used to provide the impact protrusions 1004 may be limited, and no impact protrusion will be visible through a gap that may be between the passenger seats 1002a, 1002b. Turning to FIG. 10C, the contoured class divider 1020 includes a single impact protrusion 1022 positioned behind the passenger seats 1002. In this manner, the installation may be simplified and a variety of seating styles may be used without concern for proper centering behind each passenger seat 1002. Although illustrated as a curved "speed bump" of material, in other implementations, the impact protrusions 1004, 1022 may be designed as having a triangular cross section or rectangular cross section. In some implementations, the impact protrusions 1004, 1022 are manufactured as part of the panel 1006, 1024 of the contoured class divider 1000, 1020. In other implementations, the impact protrusions 1004, 1022 are affixed to the panels 1006, 1024. For example, the impact protrusions 1004, 1022 can be made of materials having a strength sufficiently high to withstand the impact shock between the contoured class divider 1000, 1020 and the passenger seats 1002, such as metallic alloys or high-density plastics. In other embodiments, the impact protrusions are formed of energy absorbing material such as rubber to reduce the peak load transferred between the divider and the seats.

Alternatively, as illustrated in FIG. 10B, in some embodiments, passenger seats 1014 installed in front of a contoured class divider 1010 may include one or more impact protrusions 1016 disposed to create a known contact surface with a panel 1012 of the contoured class divider 1010. In this manner, the impact protrusions 1016 may be precisely positioned upon each seat back.

In some embodiments, a number, depth, surface area, shape, material composition, and/or positioning of each impact protrusion 1004, 1016, 1022 may be selected to simplify impact simulations and/or to limit damage caused by the impact between the contoured class divider 1000, 1010, 1020 and the passenger seats 1002, 1014. For example, by disposing the impact protrusion(s) 1004, 1022 upon the contoured class divider 1000, 1020 (or, alternatively, protrusions 1016 on the passenger seats 1014), a known point of impact is created between the passenger seats 1002 (1014) and the contoured class divider 1000, 1020, (1010) thus simplifying calculations for load sharing in emergency circumstances.

In some implementations, each impact protrusion 1004, 1022 is disposed in a panel reinforced area of the fore surface of the contoured class divider panel 1006, 1024 configured to withstand the impact shock between the contoured class divider 1000, 1020 and the passenger seats 1002. The panel reinforced area can be made of a material having a strength higher than a material composing the panel 1000, 1020, e.g. high-density polyethylene, Delrin, steel alloy, acrylic, a thickness greater than a thickness of the panel 12, and/or a density greater than a density of the panel 12. Similarly, each impact protrusion 1016 may be disposed in a passenger seat reinforced area of the aft surface of the passenger seats 1014 of FIG. 10B.

Each impact protrusion 1004, 1016, 1022, in some implementations, is coated with an energy absorbing layer to provide a damping between the contoured class divider panel 1006, 1024, 1012, and the passenger seats 1002, 1014. For example, the energy absorbing layer may limit scratching and other damage to the contoured class divider panel 1006, 1024, 1012 and/or the passenger seats 1002, 1014. The energy absorbing layer may be made from elastic materials such as elastomer alloys, rubber alloys, or the like.

One advantage of deploying the protrusions on the divider is that the seats need not be customized. The seats positioned directly in front of the divider may have the same configuration and construction as the remainder or majority of the seats in that cabin.

Figure 11:
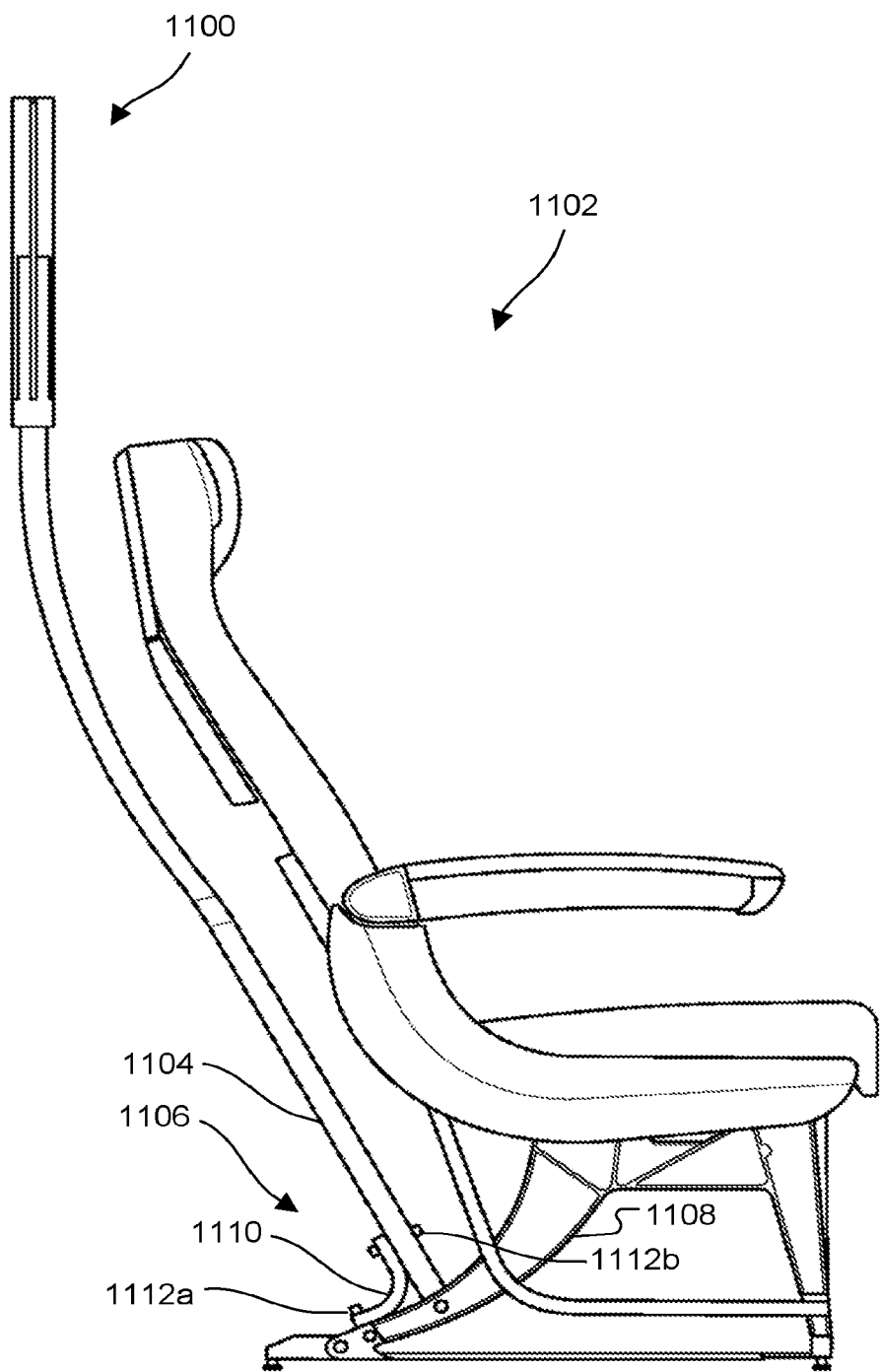
FIG. 11 is a side view of an example contoured class divider designed for affixing to at least one forward-positioned passenger seat.

FIG. 11 is a side view of a contoured class divider 1100 affixed to at least one passenger seat 1102 according to certain aspects of the disclosure. The contoured class divider 1100 can be directly affixed to the seat(s) 1102, for example, without affixing to a structure of the floor of the cabin, such as an in-floor track. For example, the contoured class divider 10 can at least one divider leg 1104 affixed to an aft part of a leg 1108 of the passenger seat 1102 via a fixation system 1106. The fixation system 1106 can include a bracket 1110 affixed to one end to the divider leg 1104 and to the other end to the leg 1108 of the passenger seat 1102. Such an arrangement may require the divider to pass the 16G dynamic test because it is mounted to a passenger restraint system (the seat). However, this arrangement provides additional ingress/egress foot clearance for the passengers seated immediately aft of the divider and may optimize usage of the space immediately aft of the rear seat leg. Moreover, the use of the connecting system to secure the top of the divider to the overhead bin may provide sufficient support such that the panel does not impart unacceptable additional load on the seat during an emergency landing.

Various details related to embodiments of contoured class dividers maybe changed without departing from the scope of the disclosure. Furthermore, the foregoing description of the preferred embodiments of the contoured class divider and best mode for practicing the use of contoured class dividers as described herein are provided for the purpose of illustration only and not for the purpose of limitation.

What is claimed is:

1. A contoured class divider for dividing an aircraft cabin arrangement between at least one forward passenger seat and at least one aft passenger seat, the contoured class divider comprising:
   a panel positioned adjacent to and rearwardly of the at least one forward passenger seat, the panel having a contoured shape for receiving a back of the forward passenger seat in at least one of a reclined position and an upright position, the panel extending substantially from an underside of an overhead bin to a lower support assembly comprising at least one leg comprising a floor mount, wherein the lower support assembly supports a lower edge of the panel above a floor of an aircraft cabin;

an upper connector that connects a top end of the panel with the overhead bin; and an articulation means connected to the upper connector and the overhead bin to articulate the panel from a rearward position during normal operation to a forward position during emergency landing, the articulation means causes the upper connector and the top end of the panel to move forward when the panel articulates from the rearward position to the forward position;

wherein the articulation means includes a straight channel comprising a first end and a second end, and a pin extending into the straight channel and actuating in response to a dynamic load greater than 16 G to slide in a single direction within the straight channel from the first end to the second end and limited from sliding back to the first end;

wherein the pin is a shear pin and the channel comprising a channel region more narrow than the first end or the second end, the shear pin inserted in the first end of the channel, the channel configured to limit movement of the shear pin in response to dynamic loads less than 16 G, and in response to a dynamic load greater than 16 G, receive the shear pin through the channel region to articulate the panel from the rearward position to the forward position.

2. The contoured class divider of claim 1, wherein the articulation means includes a spring biasing the contoured class divider into the forward position or the rearward position.

3. The contoured class divider of claim 1, wherein the articulation means articulates the panel to the forward position when the panel is subjected to a dynamic load of greater than 16 G.

4. The contoured class divider of claim 1, wherein the lower support assembly includes at least one pivot.

5. The contoured class divider of claim 1, wherein the lower support assembly is mounted in a floor track of the aircraft cabin.

6. The contoured class divider of claim 1, wherein the panel includes a first region and a second region, which pivot relative to one another.

7. The contoured class divider of claim 1, wherein the panel is located within one inch of the at least one forward passenger seat when the at least one forward passenger seat is in a take-off taxi and landing (TTOL) operational position.

8. The contoured class divider of claim 1, wherein the panel includes at least one mitigation means for mitigating head impact.

9. The contoured class divider of claim 1, wherein the panel and the at least one forward seat are configured to share loads during emergency landing.

10. A method for dividing an aircraft cabin arrangement between at least one forward passenger seat and at least one aft passenger seat, the method comprising:

positioning a panel of a contoured class divider adjacent to and rearwardly of the at least one forward passenger seat, the panel having a contoured shape for receiving a back of the forward passenger seat in at least one of a reclined position and an upright position;

fixing a lower support assembly of the contoured class divider to a structure of a floor of an aircraft cabin, the lower support assembly comprising at least one leg comprising a floor mount, wherein the panel extends substantially from an underside of an overhead bin to the lower support assembly, wherein the lower support assembly supports a lower edge of the panel above the floor of the aircraft cabin; and connecting an upper edge of the panel to the overhead bin using an upper connector coupled with a top end of the panel; and providing an articulation mechanism between the upper connector and the overhead bin that causes the panel to articulate during emergency landing from a rearward position used during normal operation to a forward position and the upper connector and the top end of the panel to move forward and upon connection of the upper edge of the panel to the overhead bin, the panel extends substantially from the underside of the overhead bin to the lower support assembly, wherein the articulation mechanism includes a straight channel comprising a first end and a second end, and a pin extending into the straight channel and actuating in response to a dynamic load greater than 16 G to slide in a single direction within the straight channel from the first end to the second end and limited from sliding back to the first end;

wherein the pin is a shear pin and the channel comprising a channel region more narrow than the first end or the second end, the shear pin inserted in the first end of the channel, the channel configured to limit movement of the shear pin in response to dynamic loads less than 16 G, and in response to a dynamic load greater than 16 G, receive the shear pin through the channel region to articulate the panel from the rearward position to the forward position.

11. The method of claim 10, wherein the articulation mechanism is configured to withstand deceleration of less than 16 G without articulating the panel.

12. The method of claim 10, wherein the lower support assembly includes at least one pivot.

13. The method of claim 10, wherein the structure of the floor of the aircraft cabin is a floor track.

14. The method of claim 10, wherein positioning the panel comprises positioning the panel in the rearward position within one inch of a recline position of the at least one forward passenger seat.

15. The method of claim 10, wherein positioning the panel comprises positioning the panel in the rearward position within a head impact zone of an aft-seated passenger in the at least one aft passenger seat, wherein the panel comprises at least one head impact zone protection feature.

16. The method of claim 10, wherein an at least one head impact zone protection feature comprises energy absorbing material embedded in a portion of the panel within a head impact zone.

17. The method of claim 10, wherein positioning the panel comprises positioning the panel such that, upon articulation, the panel is positioned to contact the at least one forward seat.

18. The method of claim 10, further comprising: prior to positioning the panel, relocating the at least one aft passenger seat closer to the at least one forward passenger seat.

* * * * *